US008135737B2

(12) United States Patent
Chowdhury et al.

(10) Patent No.: US 8,135,737 B2
(45) Date of Patent: Mar. 13, 2012

(54) QUERY ROUTING

(75) Inventors: Abdur R. Chowdhury, Oakton, VA (US); Gregory S. Pass, Reston, VA (US)

(73) Assignee: AOL Inc., Dulles, VA (US)

( * ) Notice: Subject to any disclaimer, the term of this patent is extended or adjusted under 35 U.S.C. 154(b) by 412 days.

(21) Appl. No.: 12/054,099

(22) Filed: Mar. 24, 2008

(65) Prior Publication Data

US 2008/0172368 A1    Jul. 17, 2008

Related U.S. Application Data

(63) Continuation of application No. 11/023,651, filed on Dec. 29, 2004, now Pat. No. 7,349,896.

(51) Int. Cl.
*G06F 7/00* (2006.01)
*G06F 17/30* (2006.01)

(52) U.S. Cl. ...................................... 707/771
(58) Field of Classification Search .................... 707/771
See application file for complete search history.

(56) References Cited

U.S. PATENT DOCUMENTS

| | | |
|---|---|---|
| 5,265,065 A | 11/1993 | Turtle |
| 5,640,553 A | 6/1997 | Schultz |
| 5,675,788 A | 10/1997 | Husick et al. |
| 5,873,076 A | 2/1999 | Barr et al. |
| 5,924,090 A | 7/1999 | Krellenstein |
| 5,933,822 A | 8/1999 | Braden-Harder et al. |
| 6,012,053 A | 1/2000 | Pant et al. |
| 6,169,986 B1 | 1/2001 | Bowman et al. |
| 6,175,829 B1 | 1/2001 | Li et al. |
| 6,272,507 B1 | 8/2001 | Pirolli et al. |
| 6,275,820 B1 | 8/2001 | Navin-Chandra et al. |
| 6,311,194 B1 | 10/2001 | Sheth et al. |
| 6,321,228 B1 | 11/2001 | Crandall et al. |
| 6,363,378 B1 | 3/2002 | Conklin et al. |

(Continued)

FOREIGN PATENT DOCUMENTS

CN    1434952    8/2001

(Continued)

OTHER PUBLICATIONS

Zamir, Oren et al., "Grouper: A Dynamic Clustering Interface to Web Search Results", Proc. of the 8th International World Wide Web Conf., © 1999, pp. 1-15.

(Continued)

*Primary Examiner* — Charles Lu
(74) *Attorney, Agent, or Firm* — Finnegan, Henderson, Farabow, Garrett & Dunner, LLP

(57) ABSTRACT

A search query is submitted to one or more information sources associated with a category of the query. The category of the query is indicated by a query ontology that relates queries to query categories. The information sources represent information sources from which a high percentage of search results for queries associated with the category are retrieved. For instance, the category of the query is identified by identifying categories corresponding to variations of the query, where each variation represents a combination of the terms within the query, and where the categories of the variations are assumed to be the categories of the query. Information sources associated with the query categories are identified, and the query is submitted to the identified information sources. Submitting the query to the identified information sources may cause search results retrieved for the query to more closely reflect search results desired by a user that specified the query.

12 Claims, 19 Drawing Sheets

U.S. PATENT DOCUMENTS

| | | | |
|---|---|---|---|
| 6,424,973 B1 | 7/2002 | Baclawski | |
| 6,460,029 B1 | 10/2002 | Fries et al. | |
| 6,571,249 B1 | 5/2003 | Garrecht | |
| 6,574,632 B2 | 6/2003 | Fox et al. | |
| 6,581,057 B1 | 6/2003 | Witbrock et al. | |
| 6,647,383 B1 | 11/2003 | August et al. | |
| 6,675,159 B1* | 1/2004 | Lin et al. | 1/1 |
| 6,701,310 B1 | 3/2004 | Sugiura et al. | |
| 6,701,318 B2 | 3/2004 | Fox et al. | |
| 6,704,729 B1 | 3/2004 | Klein et al. | |
| 6,728,704 B2 | 4/2004 | Mao et al. | |
| 6,751,611 B2 | 6/2004 | Krupin et al. | |
| 6,778,979 B2 | 8/2004 | Grefenstette et al. | |
| 6,778,982 B1 | 8/2004 | Knight | |
| 6,795,820 B2 | 9/2004 | Barnett | |
| 6,944,609 B2 | 9/2005 | Witbrock | |
| 6,944,612 B2 | 9/2005 | Roustant et al. | |
| 6,961,723 B2 | 11/2005 | Faybishenko et al. | |
| 7,007,014 B2 | 2/2006 | Liu et al. | |
| 7,110,983 B2 | 9/2006 | Shear et al. | |
| 7,152,059 B2 | 12/2006 | Monteverde | |
| 7,152,064 B2 | 12/2006 | Bourdoncle et al. | |
| 7,181,438 B1 | 2/2007 | Szabo et al. | |
| 7,428,530 B2 | 9/2008 | Ramarathnam et al. | |
| 7,567,953 B2 | 7/2009 | Kadayam et al. | |
| 2001/0049688 A1 | 12/2001 | Fratkina et al. | |
| 2002/0004793 A1* | 1/2002 | Keith, Jr. | 707/1 |
| 2002/0026443 A1 | 2/2002 | Chang | |
| 2002/0099700 A1* | 7/2002 | Li | 707/5 |
| 2002/0129015 A1 | 9/2002 | Caudill et al. | |
| 2002/0165860 A1 | 11/2002 | Glover et al. | |
| 2002/0169764 A1 | 11/2002 | Kincaid et al. | |
| 2002/0198869 A1 | 12/2002 | Barnett | |
| 2003/0004939 A1 | 1/2003 | Yamaguchi et al. | |
| 2003/0028512 A1* | 2/2003 | Stensmo | 707/1 |
| 2003/0041054 A1 | 2/2003 | Mao et al. | |
| 2003/0069873 A1 | 4/2003 | Fox et al. | |
| 2003/0088547 A1* | 5/2003 | Hammond | 707/3 |
| 2003/0120654 A1 | 6/2003 | Edlund et al. | |
| 2003/0130998 A1 | 7/2003 | Fox et al. | |
| 2003/0212673 A1* | 11/2003 | Kadayam et al. | 707/3 |
| 2003/0220913 A1 | 11/2003 | Doganata et al. | |
| 2003/0233224 A1 | 12/2003 | Marchisio et al. | |
| 2004/0010491 A1 | 1/2004 | Riedinger | |
| 2004/0019588 A1 | 1/2004 | Doganata et al. | |
| 2004/0024752 A1 | 2/2004 | Manber et al. | |
| 2004/0059729 A1 | 3/2004 | Krupin | |
| 2004/0093321 A1 | 5/2004 | Roustant et al. | |
| 2004/0162814 A1* | 8/2004 | Bergholz et al. | 707/3 |
| 2004/0172393 A1 | 9/2004 | Kazi et al. | |
| 2004/0215607 A1 | 10/2004 | Travis | |
| 2004/0220907 A1 | 11/2004 | Camarillo | |
| 2004/0255237 A1 | 12/2004 | Tong | |
| 2005/0050026 A1 | 3/2005 | Kawamura et al. | |
| 2005/0060290 A1* | 3/2005 | Herscovici et al. | 707/3 |
| 2005/0154716 A1 | 7/2005 | Watson et al. | |
| 2006/0004716 A1 | 1/2006 | Hurst-Hiller et al. | |
| 2006/0004850 A1 | 1/2006 | Chowdhury | |
| 2006/0020672 A1 | 1/2006 | Shannon et al. | |
| 2006/0167927 A1 | 7/2006 | Edelstein et al. | |
| 2006/0218141 A1 | 9/2006 | Tuttle et al. | |
| 2006/0235824 A1 | 10/2006 | Cheung et al. | |
| 2006/0248045 A1 | 11/2006 | Toledano et al. | |
| 2008/0040316 A1 | 2/2008 | Lawrence et al. | |

FOREIGN PATENT DOCUMENTS

| | | |
|---|---|---|
| EP | 1060449 | 6/2003 |
| WO | WO 97/21183 | 6/1997 |
| WO | WO 99/66427 | 12/1999 |
| WO | WO 01/16807 | 3/2001 |
| WO | WO 01/80077 | 10/2001 |
| WO | WO 02/13064 | 2/2002 |
| WO | WO 2004/027669 | 4/2004 |

OTHER PUBLICATIONS

USPTO Final Office Action issued in U.S. Appl. No. 11/023,642, mailed Jan. 7, 2010, 55 pages.

Office Action from copending U.S. Appl. No. 11/023,645, dated Sep. 11, 2007.

Office Action from copending U.S. Appl. No. 11/023,633, dated Oct. 4, 2007, 17 pages.

Office Action from copending U.S. Appl. No. 11/023,633, dated Apr. 18, 2007.

Office Action from copending U.S. Appl. No. 11/023,642, dated May 11, 2007.

Notice of Allowance from copending U.S. Appl. No. 11/023,648, dated May 16, 2007.

Office Action from copending U.S. Appl. No. 11/023,643, dated Apr. 2, 2007.

Gauch, Susan et al., "ProFusion*: Intelligent Fusion from Multiple, Distributed Search Engines", Journal of Universal Computer Science, vol. 2, No. 9, Sep. 1996, 13 pages.

Rasolofo Y. et al., "Result Merging Strategies for a Current News Metasearcher," Information Processing & Management 39 (2003), Elsevier, Barking GB, pp. 581-609.

Oztekin B.U. and Karypis, G. and Kumar, V., "Expert Agreement and Content Based Reranking in a Meta Search Environment Using Mearf," Proceedings of the 11$^{th}$ International Conference on World Wide Web, May 7-11, 2002, Honolulu, Hawaii, pp. 333-344.

Craswell, N., Hawking, D. and Thistlewaite, P., "Merging Results from Isolated Search Engines," Proceedings of the 10$^{th}$ Australasian Database Conference, Aukland, New Zealand, Jan. 18-21, 1999, 12 pages.

Meng, W. et al. "Building Efficient and Effective Metasearch Engines," ACM Computing Surveys, vol. 34, No. 1, Mar. 2002, New York, NY, pp. 48-89.

Spoerri A., "Coordinated Views and Tight Coupling to Support Mega Searching," Proceedings of the Second International Conference on Coordinated and Multiple Views in Exploratory Visualization, 2004, pp. 39-48.

Baeza-Yates, R. et al., "Modern Information Retrieval, Chapter 13, Searching the web," Modern Information Retrieval, Harlow: Addison-Wesley, GB, 1999, pp. 367-395.

Fei-Yue Wang et al., "An Application Specific Knowledge Engine for Researches in Intelligent Transportation Systems," 2004 IEEE Intelligent Transportation Systems Conference, Washington, DC, Oct. 3-6, 2004, pp. 841-846.

Etzioni, O., "Moving Up the Information Food Chain, Deploying Sofbots on the World Wide Web," Proceedings on the Thirteenth National Conference on Artificial Intelligence, Aug. 4, 1996, pp. 1322-1326.

Zhang, J. and Cheung, C. "Meta-Search-Engine Feature Analysis," Online Information Review, vol. 27, No. 6, 2003, pp. 433-441.

Desai, M. and Spink, A., "An Approach to Document Clustering Based on System Relevance," Proceedings of the 67th American Society for Information Science and Technology (ASIS&T), vol. 41, No. 1, Nov. 12, 2004, pp. 256-266.

Jain A. K., et al., "Data Clustering: A Review," ACM Computing Surveys, New York, NY, vol. 31, No. 3, Sep. 3, 1999, pp. 264-323.

Gauch, Susan et al., "ProFusion*: Intelligent Fusion from Multiple, Distributed Search Engines," Journal of Universal Computer Science, vol. 2, No. 9, Sep. 1996, 13 pages.

Khan, "Ontology-based Information Selection," reprinted from http://www.utdallas/edu/research/esc/publication/ikhan-def.pdf on Mar. 4, 2005 (129 pages).

Si et al., "Using Sampled Data and Regression to Merge Search Engine Results," reprinted from http://www-2.cs.cum.edu~callan/apers/signin02-1si.pdf on Dec. 21, 2004 (8 pages).

Lemur: Distributed Information Retrieval, "Distributed Information Retrieval in Lemur," reprinted from http://www-2.cs.cmu.edu/~lemur/3.1/distrib.html on Dec. 21, 2004 (pp. 1-7).

Beitzel et al., On Fusion of Effective Retrieval Strategies in the Same Information Retrieval System, reprinted from http://www.in.iit.edu/publications/downloads/2004_JASIST_effectivestrategiesfusion.pdf on Mar. 4, 2005 (pp. 1-13).

Beitzel et al., "Evaluation of Filtering Current News Search Results," reprinted from http://www.ir.iit.edu/publications/downloads/p135-beitzel.pdf on Mar. 4, 2005 (2 pages).

Chowdhury et al., "Operational Requirements for Scalable Search Systems," reprinted from http://ir.iit.edu/~abdur/publications/p345-chowdhury.pdf on Mar. 4, 2005 (pp. 435-442).

European Office Action for Application No. 05855735.6, dated Mar. 9, 2009, 6 pages.

USPTO Final Office Action issued in U.S. Appl. No. 11/023,645, mailed Jul. 24, 2009, 28 pages.

Office Action for Chinese Application No. 200580047571.X, mailed Sep. 12, 2008, with English-language translation.

Cugini, John, et al., "Design of 3-D Visualization of Search Results: Evolution and Evaluation," Visual Data Exploration and Analysis VII, Proc. of SPIE, vol. 3960, 2000, pp. 198-210.

Dwork, Cynthia, et al., "Rank Aggregation Methods for the Web,"WWW10, Hong Kong, May 1-5, 2001, pp. 613-622.

Sebrechts, Marc M., et al., "Visualization of Search Results: A Comparative Evaluation of Text, 2D, and 3D Interfaces," SIGIR '99, Berkeley, CA, 1999, pp. 3-10.

Advisory Action, U.S. Appl. No. 11/023,633, mailed Jun. 26, 2008 (3 pages).

Advisory Action, U.S. Appl. No. 11/023,642, mailed Feb. 1, 2008 (4 pages).

Advisory Action, U.S. Appl. No. 11/023,642, mailed Apr. 2, 2010 (3 pages).

Examiner's Answer to Appeal Brief, U.S. Appl. No. 11/023,642, mailed Oct. 6, 2008 (66 pages.).

Final Office Action, U.S. Appl. No. 11/023,633, mailed Apr. 7, 2008 (15 pages).

Final Office Action, U.S. Appl. No. 11/023,642, mailed Nov. 16, 2007 (43 pages).

Final Office Action, U.S. Appl. No. 11/023,643, mailed Jun. 26, 2008 (13 pages).

Final Office Action, U.S. Appl. No. 11/023,645, mailed May 29, 2008 (18 pages).

Notice of Allowance, U.S. Appl. No. 11/023,633, mailed Mar. 26, 2009 (15 pages).

Notice of Allowance, U.S. Appl. No. 11/023,642, mailed Jun. 11, 2010 (9 pages).

Notice of Allowance, U.S. Appl. No. 11/023,643, mailed Dec. 17, 2008 (16 pages).

Office Action, U.S. Appl. No. 11/023,633, mailed Oct. 1, 2008 (15 pages).

Office Action, U.S. Appl. No. 11/023,642, mailed May 14, 2009 (56 pages).

Office Action, U.S. Appl. No. 11/023,645, mailed Dec. 31, 2008 (21 pages).

* cited by examiner

600

605   610

600

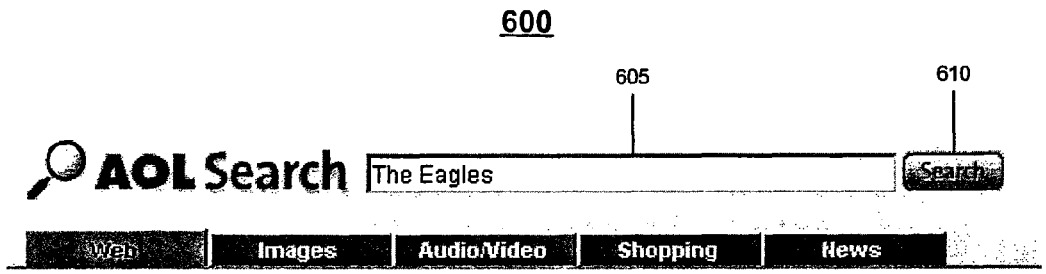

810 —— Original Query: eagles
815 —— Selected Category: The Eagles (Musicians)
820 —— Available Alternative Categories: Philadelphia Eagles (Football)   eagles (Bird)

Matching Sites: Page 1 of 64534
What is a Matching Site?

805a —— • The Eagles ▢ - The Eagles. Reviews on this page: ... The semi-offical Eagles web site includes all the standard trimmings, but unfortunately it's cluttered with too many pictures. ...
http://www.warr.org/eagles.html 805b —— • Eagles fan site - Desperado ▢ - -Help ...
http://www.eaglesmusic.com/

805c —— • Amazon.com: Music: Eagles - Their Greatest Hits 1971-1975 ▢ - ... So You'd Like to... Get a CD or 10...: A guide by nyggoblue, Music Collector Create your guide. Don Henley Check out our favorite Don Henley and Eagles titles! ...
http://www.amazon.com/exec/obidos/tg/detail/-/B000002GVS?v=glance 805d —— • Amazon.com: Music: Hotel California ▢ - ... If you want some good Eagles music, skip this one (and The Long Run), and pick up one of their first few LPs. Was this review helpful to you? (Report this). ...
http://www.amazon.com/exec/obidos/tg/detail/-/B000002GVO?v=glance
[More results from www.amazon.com]

805e —— • Dansm's Eagles Page ▢ - ... My page was designed so guitarists could have a site solely devoted to Eagles music. Below you'll find lots of guitar chords, tabs, and links to other pages. ...
http://www.people.fas.harvard.edu/~desmith/guitar/eagles.htm

FIG. 8

QUERY ROUTING

CROSS-REFERENCE TO RELATED APPLICATIONS

This application is a continuation of U.S. patent application Ser. No. 11/023,651 filed Dec. 29, 2004 (now U.S. Pat. No. 7,349,896), which is related to U.S. patent application Ser. No. 11/023,643, filed Dec. 29, 2004, and titled "Query Disambiguation" (now U.S. Pat. No. 7,562,069), U.S. patent application Ser. No. 11/023,642, filed Dec. 29, 2004, and titled "Search Fusion", U.S. patent application Ser. No. 11/023,648, filed Dec. 29, 2004, and titled Domain Expert Search" (now U.S. Pat. No. 7,272,597), U.S. patent application Ser. No. 11/023,645, filed Dec. 29, 2004, and titled "Query Reformulation" and U.S. patent application Ser. No. 11/023,633, filed Dec. 29, 2004, and titled "Filtering Search Results" (now U.S. Pat. No. 7,571,157), all of which are incorporated by reference.

TECHNICAL FIELD

This document relates to retrieving and presenting search results for search queries.

BACKGROUND

Conventional search engines retrieve a set of search results that correspond to a search query. Some search results may direct a user to Internet resources that do not interest the user, even though the search results match the search query. For example, this issue may arise when a query relates to multiple different topics, one or more of which being of little or no interest to the query submitter, in which case search results are produced that are representative of each of the different topics.

SUMMARY

In one general aspect, routing a query includes maintaining a query ontology that includes one or more query categories and one or more queries associated with each of the one or more categories. The one or more queries associated with a particular category included in the query ontology represent queries associated with that particular category. A query is received from a user. The received query is compared against one or more of the queries that are included within the query ontology. Variations of the received query are formulated. Each variation represents a combination of one or more terms included in the received query. One or more categories that correspond to one or more of the formulated variations of the received query are identified from within the query ontology. An information source corresponding to one of the identified categories is identified, and the received query is routed to the identified information source.

Implementations may include one or more of the following features. For example, multiple information sources corresponding to one or more of the identified categories may be identified, and the received query may be routed to the identified information sources.

Routing the received query to the identified information source may include submitting the received query to the identified information source, and receiving search results for the received query from the identified information source.

Routing the received query to the identified information source may include submitting the received query to a search engine with an instruction to return search results from only the identified information source. Search results from only the identified information source for the received query may be received from the search engine.

Search results from the identified information source for the received query may be made perceivable to the user.

The identified information source corresponding to the identified category may be associated with the identified category in the query ontology. Identifying the information source corresponding to the identified category may include identifying the information source associated with the identified category from the query ontology.

Maintaining a query ontology may include arranging one or more categories within the query ontology as nodes in a directed acyclic graph. Identifying one or more categories included in the query ontology that correspond to variations of the received query may include identifying one or more categories included in the query ontology that are ancestor or child categories of categories included in the query ontology with which the variations of the received query are associated.

Identifying the one or more categories included in the query ontology that correspond to variations of the received query may include identifying multiple categories included in the query ontology that correspond to the variations of the received query. A subset of the multiple categories may be identified as the categories that correspond to the variations of the received query. Identifying a subset of the multiple categories may include identifying a subset of the multiple categories based on a determination of whether the subset of categories may correspond to a single query. Identifying a subset of the multiple categories based on a determination of whether the subset of categories may correspond to a single query may include identifying the subset of categories based on a probability that categories included in the subset of categories may correspond to a single query. Identifying the subset of categories based on a determination of whether categories included in the subset of categories have corresponded previously to a single query.

The received query may be supplemented with information associated with a category included in the query ontology that corresponds to the received query.

The information source may represent an information source from which a high percentage of search results for queries associated with the identified category are identified. Each variation of the received query may represent a subset of consecutive terms from within the query. The consecutive terms are included in the variation in an order in which the consecutive terms are included in the query.

These general and specific aspects may be implemented using a system, a method, or a computer program, or any combination of systems, methods, and computer programs.

Other features will be apparent from the description and drawings, and from the claims.

DESCRIPTION OF DRAWINGS

FIG. 8 illustrates another exemplary interface that relates to the interfaces of FIGS. 6 and 7 but that is made perceivable after a specified query has been resolved to correspond to a single query category.

Like reference symbols in the various drawings indicate like elements.

DETAILED DESCRIPTION

A search query is submitted to one or more information sources associated with a category of the query. The category of the query is indicated by a query ontology that relates queries to query categories. The information sources represent information sources from which a high percentage of search results for queries associated with the category are retrieved. For instance, the category of the query is identified by identifying categories corresponding to variations of the query, where each variation represents a combination of the terms within the query, and where the categories of the variations are assumed to be the categories of the query. Information sources associated with the query categories are identified, and the query is submitted to the identified information sources. Submitting the query to the identified information sources may cause search results retrieved for the query to more closely reflect search results desired by a user that specified the query.

Figure 1:
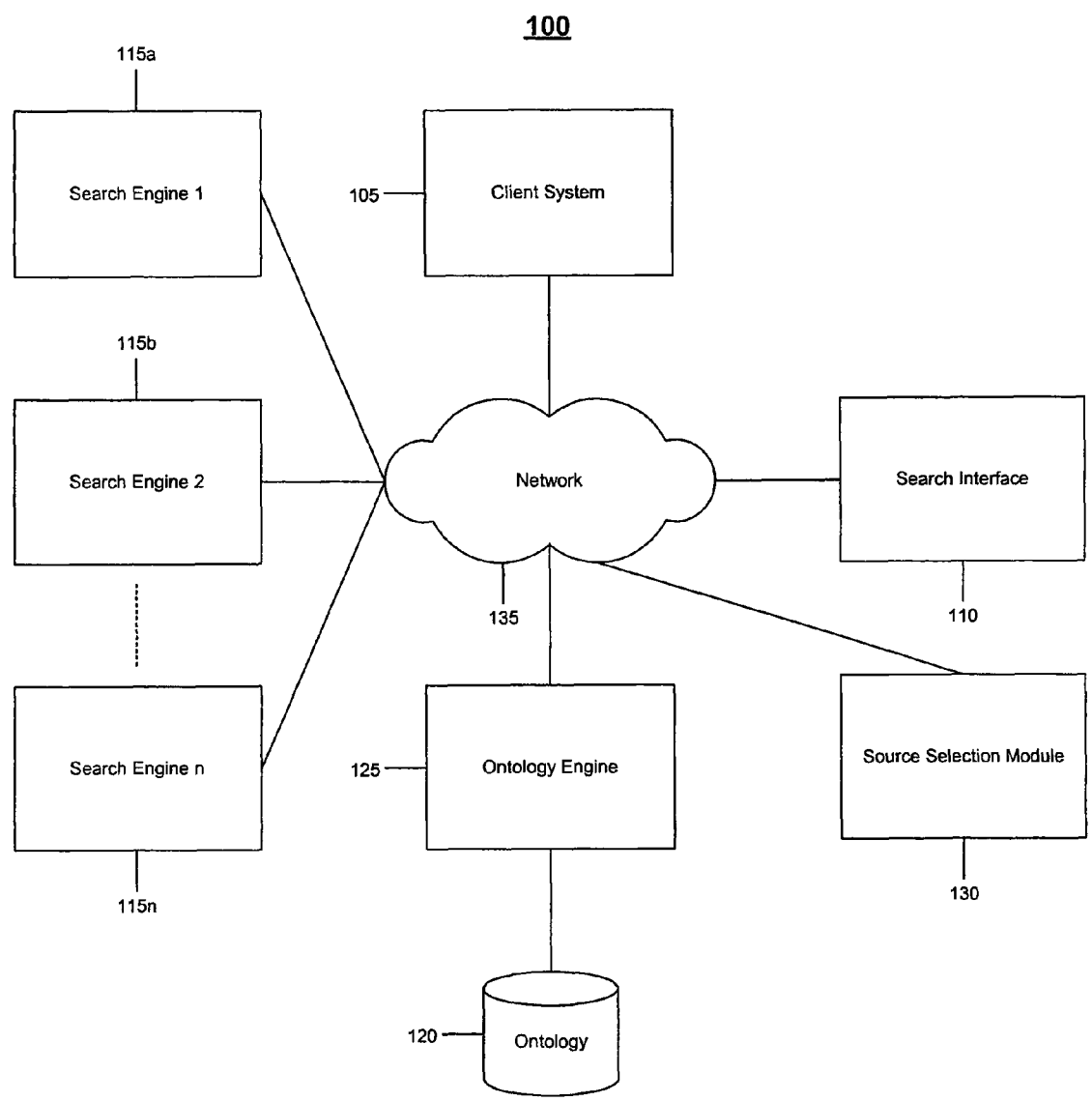
FIG. 1 is a block diagram illustrating an exemplary networked computing environment.

Referring to FIG. 1, an exemplary networked computing environment 100 enables a user to search for particular Internet resources. Client systems 105 are manipulated by users to provide a query to a search interface 110 through with a search for particular Internet resources is performed. The search interface 110 submits the query to one or more search engines 115a-115n. An ontology 125 and an ontology engine 120 are used to disambiguate and reformulate the query before submission to the search engines 115a-115n based on a category of the query. A source selection module 130 identifies one or more of the search engines 115a-115n to which the query should be submitted based on a category of the query. A network 135 interconnects the client system 105, the search interface 110, the search engines 115a-115n, the ontology 125, the ontology engine 120, and the source selection module 130.

The client system 105 includes one or more communications programs that may be used by the user to submit search queries for the particular Internet resources to the search interface 110. The communications programs may include a web browser, an e-mail program, an instant messaging program, a file transfer protocol (FTP) program, or another communications program. The client system 105 also may include one or more input devices, such as a keyboard, a mouse, a stylus, a camera, or a microphone, with which the user may specify the search queries. The client system 105 also includes one or more output devices, such as a monitor, a touch screen, speakers, or a printer, with which search results for the search queries from the search interface 110 may be presented to the user. The search results may be indications of Internet resources that match the search queries, or the matching Internet resources themselves. The client system 105 also may be configured to communicate with other components of the networked computing environment 100.

The search interface 110 receives queries specified by the user from the client system 105. The search interface 110 may modify the queries and may submit the queries to particular ones of the search engines 115a-115n in order to retrieve search results for the received queries that represent search results desired by the user. For example, the search interface 110 may identify a query category among multiple query categories that corresponds to a received query as a query category that the user intended for the received query. The query may be disambiguated such that the query corresponds only to the intended category. In addition, the query may be reformulated with one or more keywords typically found in search results for queries of the intended category. Furthermore, the search interface 110 may submit the received query only to particular ones of the search engines 115a-115n that typically return search results for queries of the intended category. Modifying the received query and submitting the received query only to particular ones of the search engines 115a-115n based on the intended category of the query cause search results that are retrieved for the received query to be representative of the intended category.

The search interface 110 also may assign or associate scores to the search results retrieved for the received query. The assigned scores may be based on visual characteristics of surrogate representations of the search results that are received from the search engines 115a-115n. The search interface 110 also may sort or filter the search results based on the assigned scores such that search results that are most or least relevant to the received query made known to the client system 105 and/or such that the most or least relevant are filtered out or through for presentation to the user.

The search engines 115a-115n identify Internet resources that match a query that has been received from the search interface 110. The search engines 115a-115n may identify the matching Internet resources using one or more databases that include indexes of Internet resources. The indexes may include keywords or descriptions of Internet resources that are matched against the received query. If the keywords or description for an Internet resource matches the search query, then the Internet resource is identified as a search result for the received query. The search engines 115a-115n may be configured to match the received query against all possible Internet resources indexed in the databases, or against the Internet resources indexed in the databases that are from a particular source. Furthermore, the search engines 115a-115n may be specialized such that the databases for one of the search engines 115a-115n index only particular Internet resources. For example, the search engine 115a may be a search engine that is specialized for cars such that the search engine 115a indexes only Internet resources that are related to cars.

The ontology 125, which also may be called a query ontology, relates search queries to categories of search queries. The ontology 125 may categorize a very large number of search queries into a relatively small number of categories of search queries. The ontology 125 also may identify one or more keywords for each of the categories of search queries. The keywords for a category may represent words or phrases that appear in a high percentage of search results for queries corresponding to the category. In some implementations, the ontology 125 may identify one or more expert domains for each of the categories of search queries, which represent domains from which a high percentage of search results for queries corresponding to each particular category are identified. The structure of the ontology 125 will be described in further detail with respect to FIGS. 2A, 2B, 3A, and 3B.

The ontology engine 120 is an interface to the ontology 125 that is accessed by the search interface 110. The ontology engine 120 receives a query from the search interface 110 and identifies one or more categories from the ontology 125 that correspond to the received query. More particularly, the ontology engine 120 searches for the query in the ontology 125 and returns the one or more categories from the ontology 125 in which the query is found. In addition, the ontology engine 120 may return keywords associated with the one or more categories corresponding to the query, as indicated by the ontology 125.

The source selection module 130 identifies one or more expert domains that may be used to identify appropriate search results for search queries. More particularly, the source selection module 130 receives a query from the search interface 110 and identifies one or more expert domains that may be used to identify appropriate search results for the received query. Such an identification may be made by first identifying one or more categories for the received query using the ontology 125 and the ontology engine 120, and then identifying one or more expert domains corresponding to the identified categories. As a result, the source selection module 130 may relate query categories to expert domains that are appropriate for the query categories. In implementations where the ontology 125 identifies expert domains for the categories included in the ontology 125, the source selection module 130 may be included in the ontology engine 120. In such implementations, the source selection module 130 may identify expert domains for queries based on information included in the ontology 125.

The network 135 may be a network that connects the components of the networked computing environment 100, such as the Internet, the World Wide Web, wide area networks, (WANs), local area networks (LANs), analog or digital wired and wireless telephone networks (e.g. a public switched telephone network (PSTN), an integrated services digital network (ISDN), or a digital subscriber line (xDSL)), radio, television, cable, satellite, and/or any other delivery mechanism for carrying data. The components of the networked computing environment 100 are connected to the network 135 through communications pathways that enable communications through the network 135. Each of the communication pathways may include, for example, a wired, wireless, cable or satellite communication pathway, such as a modem connected to a telephone line or a direct internetwork connection. The components of the networked computing system 100 may use serial line internet protocol (SLIP), point-to-point protocol (PPP), or transmission control protocol/internet protocol (TCP/IP) to communicate with one another over the network 135 through the communications pathways.

Each of the components of the networked computing environment 100 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The components may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the components.

Further, each of the components of the networked computing environment 100 includes a communications interface used send communications through network 110. The communications may include, for example, e-mail messages, instant messages, audio data, video data, general binary data, or text data (e.g., encoded in American Standard Code for Information Interchange (ASCII) format).

Figure 2A:
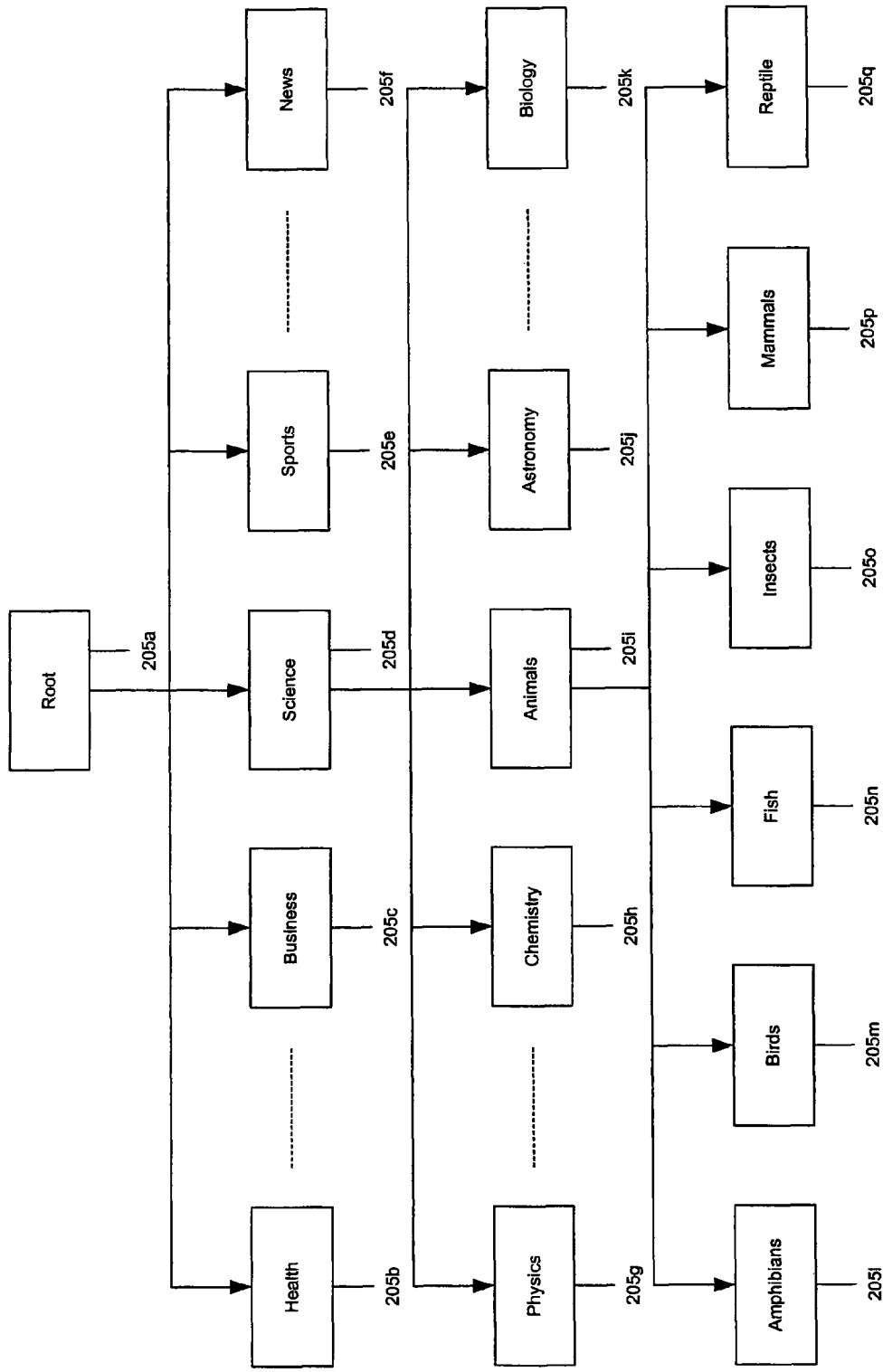
FIGS. 2A and 2B are block diagrams illustrating an exemplary ontology that relates queries to query categories.
Figure 2B:
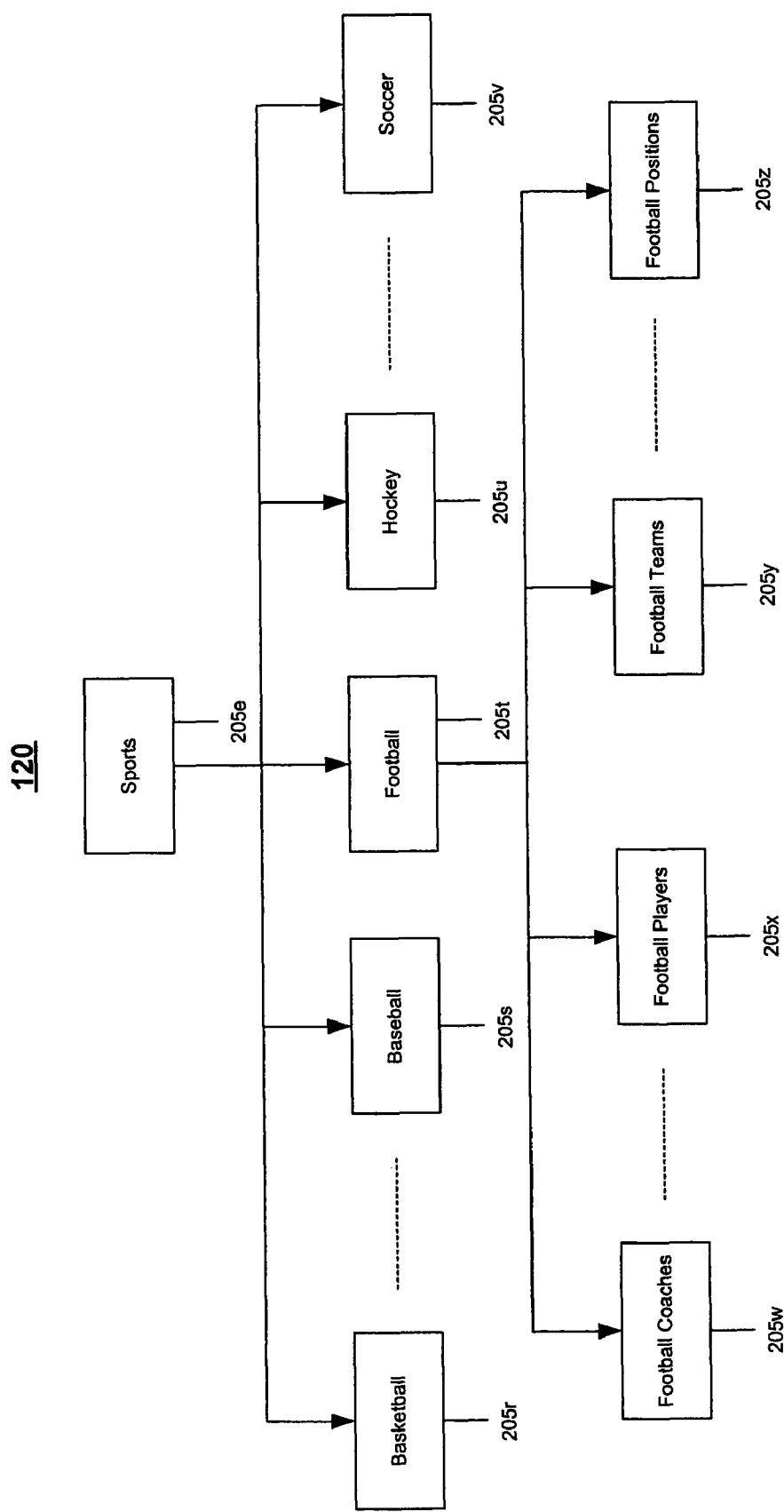

Referring to FIGS. 2A and 2B, a portion of one implementation of the ontology 125 of FIG. 1 includes categories 205a-205z that are arranged as nodes in a directed acyclic graph. Each of the categories 205a-205z is associated with one or more queries that are representative of the category. The queries that are associated with one of the categories 205a-205z may be referred to as included in the category. Each of the categories 205a-205z also may be associated with one or more keywords and one or more expert domains for the category. As described above, the keywords represent words or phrases that appear in a high percentage of search results for queries associated with the category, and the expert domains represent domains from which a high percentage of search results for queries corresponding to the category are identified.

When a first category appears above a second category in the ontology 125, the first category may be referred to as a parent category of the second category, and the second category may be referred to as a child category of the first category. For example, in relative terms, the science category 205d is a parent category, and the categories 205g-205k are children categories of the science category 205d. In general, an arrow directly from a first category to a second category indicates that the first category is a parent category of the second category. More generally, one or more arrows from a first category to a second category through one or more intermediate categories indicate that the first category is an ancestor category of the second category, and that the second category is a child category of the first category.

A parent category includes queries that are more general than queries included in a child category of the parent category. For example, the science category 205d is more general than the children categories 205g-205k, which include the physics category 205g, the chemistry category 205h, the animals category 205i, the astronomy category 205j, and the biology category 205k. Queries associated with a particular category may be referred to as corresponding to the particular category, as well as to other categories included in the ontology 125 that are ancestor or child categories of the particular category. Furthermore, categories that are ancestor or child categories of a category that includes a particular query may be referred to as corresponding to the particular query. In the implementation of the ontology 125 illustrated in FIGS. 2A and 2B, each of the categories 205a-205z has only one parent category. However, in other implementations of the ontology 125, each of the categories 205a-205z may have any number parent categories and any number of child categories.

In some implementations, some of the categories 205a-205z are not associated with keywords or expert domains. In such implementations, keywords and expert domains for those categories may be keywords and expert domains associated with one or more ancestor or child categories of those categories. For example, if no keywords and expert domains are associated with the reptile category 205q, keywords and expert domains from the animals category 205i, the science category 205d, or the root category 205a may be used for the reptile category 205q. When keywords and expert domains are associated with a child category of ancestor category, keywords and expert domains from the ancestor category may be used in place of, or in addition to, the keywords and the expert domains for the child category.

In other implementations of the ontology 125, the categories 205a-205z are not arranged as nodes in a directed acyclic graph such that relationships do not exist between the categories 205a-205z. As a result, keywords and expert domains for a query may be identified only from a category with which the query is associated. In such implementations, keywords, and expert domains may associated with all of the categories 205a-205z.

Figure 3A:
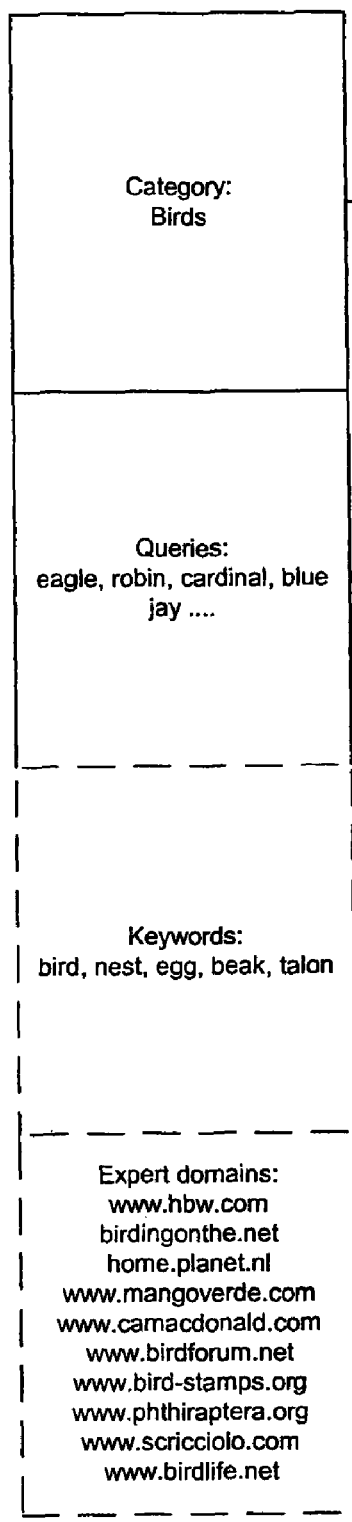
FIGS. 3A and 3B are block diagrams illustrating exemplary categories included in the ontology of FIGS. 2A and 2B.
Figure 3B:
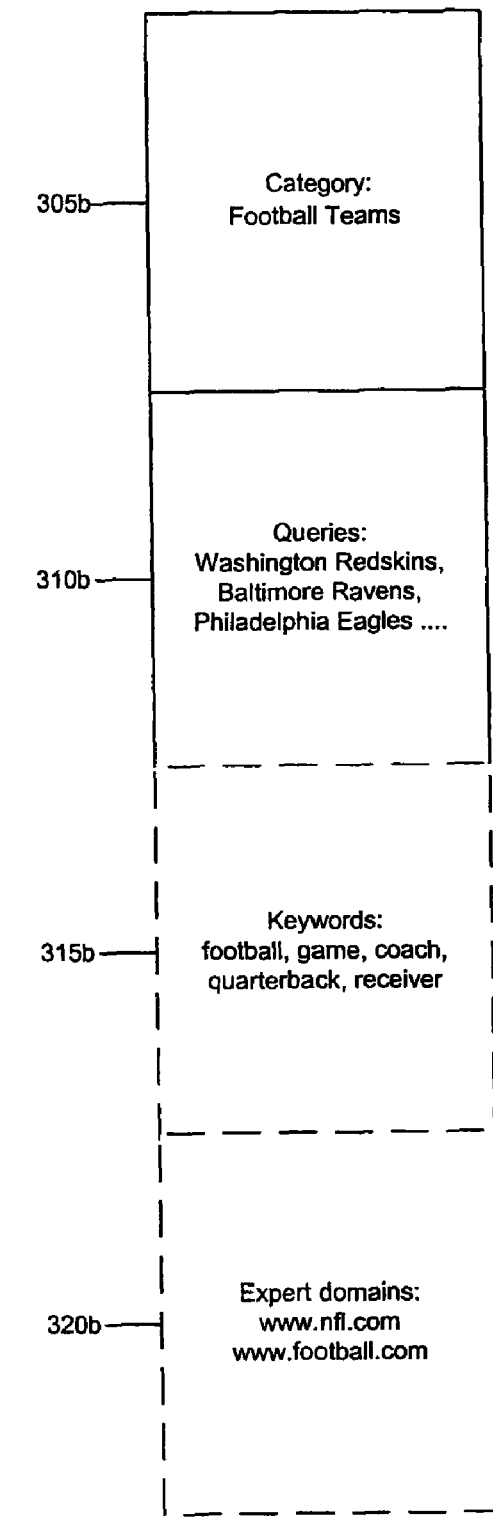

FIGS. 3A and 3B illustrate exemplary categories 205m and 205y from the ontology 125. The birds category 205m is a child category of the animals category 205i, the science category 205d, and the root category 205a. The football teams category 205y is a child category of the football category 205t, the sports category 205e, and the root category 205a. The categories 205m and 205y include names 305a and 305b and associated query lists 310a and 310b, respectively. In this example, the category 205m is named "Birds" and is associated with queries that include "eagle," "robin," "cardinal," and "blue jay," and the category 205y is named "Football Teams" and is associated with queries that include "Washington Redskins," "Baltimore Ravens," and "Philadelphia Eagles." The queries listed in the query lists 310a and 310b may be associated with the categories 205m and 205y manually or through automatic processes that identify appropriate categories for queries.

The categories 205m and 205y may be associated with keyword lists 315a and 315b. The keywords included in the keyword list 315a represent words or phrases that appear in a high percentage of search results for the queries included in the query list 310a. Similarly, the keywords included in the keyword list 315b represent words that frequently appear in search results for the queries included in the query list 310b. In this example, the keyword list 310a includes the keywords "bird," "nest," "egg," "beak," and "talon," and the keyword list 310b includes the keywords "football," "game," "coach," "quarterback," and "receiver." The keywords included in the keyword lists 315a and 315b may be identified through execution of a process that will be described with respect to FIG. 11.

The categories 205m and 205y also may be associated with expert domain lists 320a and 320b. The expert domains included in the expert domain list 320a represent domains from which a high percentage of search results for the queries included in the query list 310a are retrieved. Similarly, the expert domains included in the expert domain list 320b represent domains from which a high percentage of search results for the queries included in the query list 310b are retrieved. In this example, the expert domain list 320a includes the domains "www.hbw.com," "birdingonthe.net," "home.planet.nl," "www.mangoverde.com," "www.camacdonald.com," "www.birdforum.net," "www.bird-stamps.org," "www.phthiraptera.org," "www.scricciolo.com," and "www.birdlife.net," and the domain list 320b includes the domains "www.nfl.com" and "www.football.com." The expert domains included in the expert domain lists 320a and 320b may be identified through execution of a process that will be described with respect to FIG. 14.

Both of the query lists 315a and 315b include a query that includes the word "eagle." As a result, when a query that includes the word "eagle" is received, for example, from the client system 105 of FIG. 1, both the category 205m and the category 205y will be identified as corresponding to the received query. Such an identification may be made because "eagles" matches the query "eagle" from the query list 310a and the query "Philadelphia Eagles" from the query list 310b. In other words, the query may ambiguously correspond to both of the categories 205m and 205y, even though a user from which the query was received may have intended only one of the queries 205m and 205y for the query. The query may be disambiguated in order to provide the user with search results that are appropriate for the category that the user intended for the query.

Figure 4:
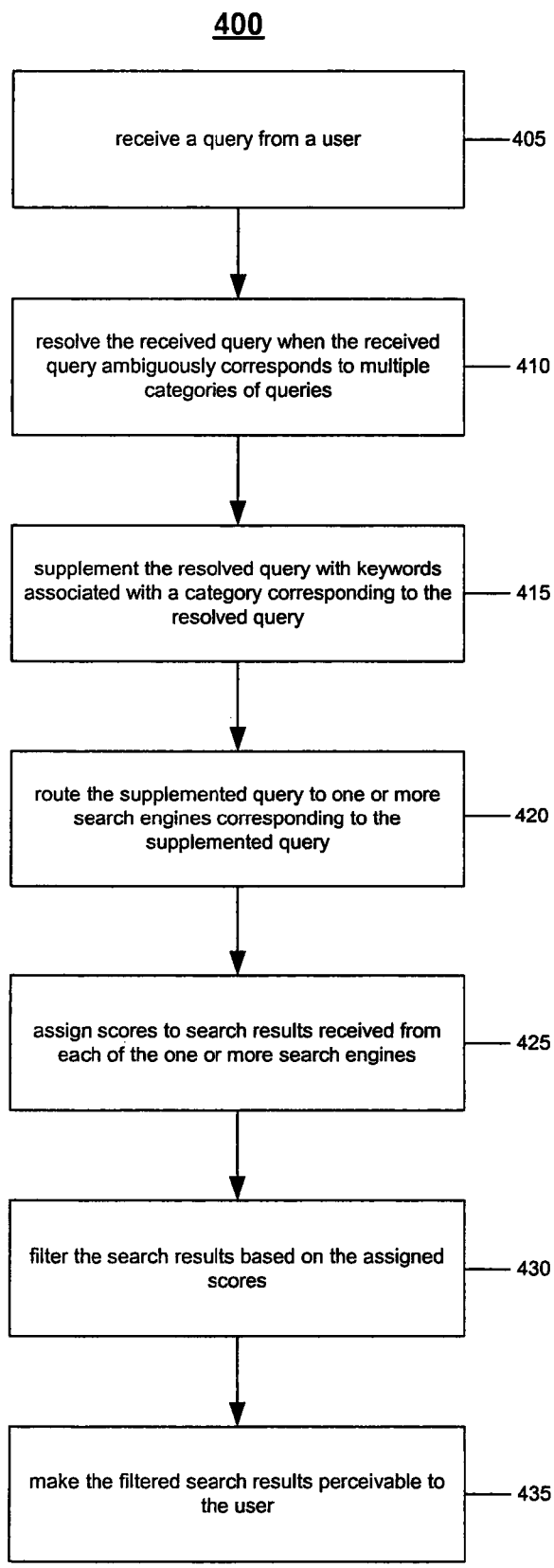
FIG. 4 is a flow chart illustrating an exemplary process for retrieving search results for a query.

Referring to FIG. 4, a process 400 is used to obtain search results for a query. The query is processed based on a category of the query. The processed query is submitted to search engines that correspond to the category of the query. Search results received from the search engines are scored and filtered based on the assigned scores. The process is executed by a search interface, such as the search interface 110 of FIG. 1.

The process 400 begins when the search interface receives a query from a user (405). The search interface is accessed by a user of a client system, such as the client system 105 of FIG. 1. The search interface provides a user interface with which the user may specify the query to the client system, and the client system makes the user interface perceivable to the user such that the user may specify the query. Once specified, the query is sent from the client system to the search interface, and the search interface receives the query.

The search interface resolves the received query when the received query ambiguously corresponds to multiple query categories (410). The query categories are indicated by a query ontology, such as the query ontology 125 of FIGS. 1, 2A, and 2B, which relates a query to one or more of the categories. In general, the query is resolved to correspond to a subset of the multiple query categories. For example, in typical implementations, the query is resolved to correspond only to one of the multiple query categories that corresponds to a query category that the user intended for the query. Resolving the query is described in further detail with respect to the exemplary process 410 of FIG. 5.

The search interface then supplements the resolved query with keywords associated with the single query category corresponding to the resolved query (415). The keywords may be associated with the single category in the query ontology. The keywords represent words or phrases that are found in a high percentage of search results for queries associated with the single category in the query ontology. The keywords are identified and associated with the single category with a process such as that described below with respect to FIG. 11. The keywords are added to the resolved query such that search results retrieved for the query are representative of the single category. An example of supplementing the query with the keywords is described in further detail with respect to process 415 of FIG. 9.

The search interface routes the supplemented query to one or more search engines corresponding to the supplemented query (420). More particularly, the supplemented query is submitted to one or more search engines that correspond to the single category in the query ontology corresponding to the supplemented query. The search engines to which the supplemented query is submitted represent search engines from which a high percentage of search results for queries associated with the single category are retrieved. The search engines are identified and associated with the single category using, for example, a process described below with respect to FIG. 14. The supplemented query is submitted to the one or more search engines such that search results retrieved in response to the query are representative of the single category. An example of submitting the supplemented query to the one or more search engines is described in further detail with respect to process 420 of FIG. 12.

Search results for the received query are received from each of the one or more search engines, and the search interface assigns scores to the received search results (425). Each of the one or more search engines provides surrogate representations of the search results to the search interface. A surrogate representation of a search result is a relatively short summary or excerpt of the search result that may be presented in place of the search results itself. The search interface then assigns scores to the search results based on visual characteristics of the surrogate representations of the search results. An example of assigning scores to the received search results is described in further detail with respect to process 425 of FIG. 15.

The search interface filters the search results based on the assigned scores (430). More particularly, differences between scores assigned to the search results are used to identify search results that should be filtered. In general, large differences in scores indicate that search results should be eliminated. The search results that are not eliminated represent high quality search results for the query originally received from the user, though they may themselves be sorted based upon the scores. Filtering the search results based on the assigned scores is described in further detail with respect to exemplary process 430 of FIG. 17.

The search interface makes the filtered search results perceivable to the user of the client system (435). More particularly, the search interface sends the surrogate representations of the search results that have not been eliminated to the client system, and the client system presents the surrogate representations to the user.

Particular implementations of the process 400 may include only a subset of the operations 410-430. For example, in one implementation, the search results may not be filtered prior to being presented to the user. In another implementation, the query may not be supplemented with keywords prior to being submitted to the one or more search engines. In another implementation, the query may be submitted to all available search engines, instead of only to the search engines associated with the category of the query. In yet another implementation, the query may not be resolved, particularly when the query originally corresponds to only one category in the query ontology.

Figure 5:
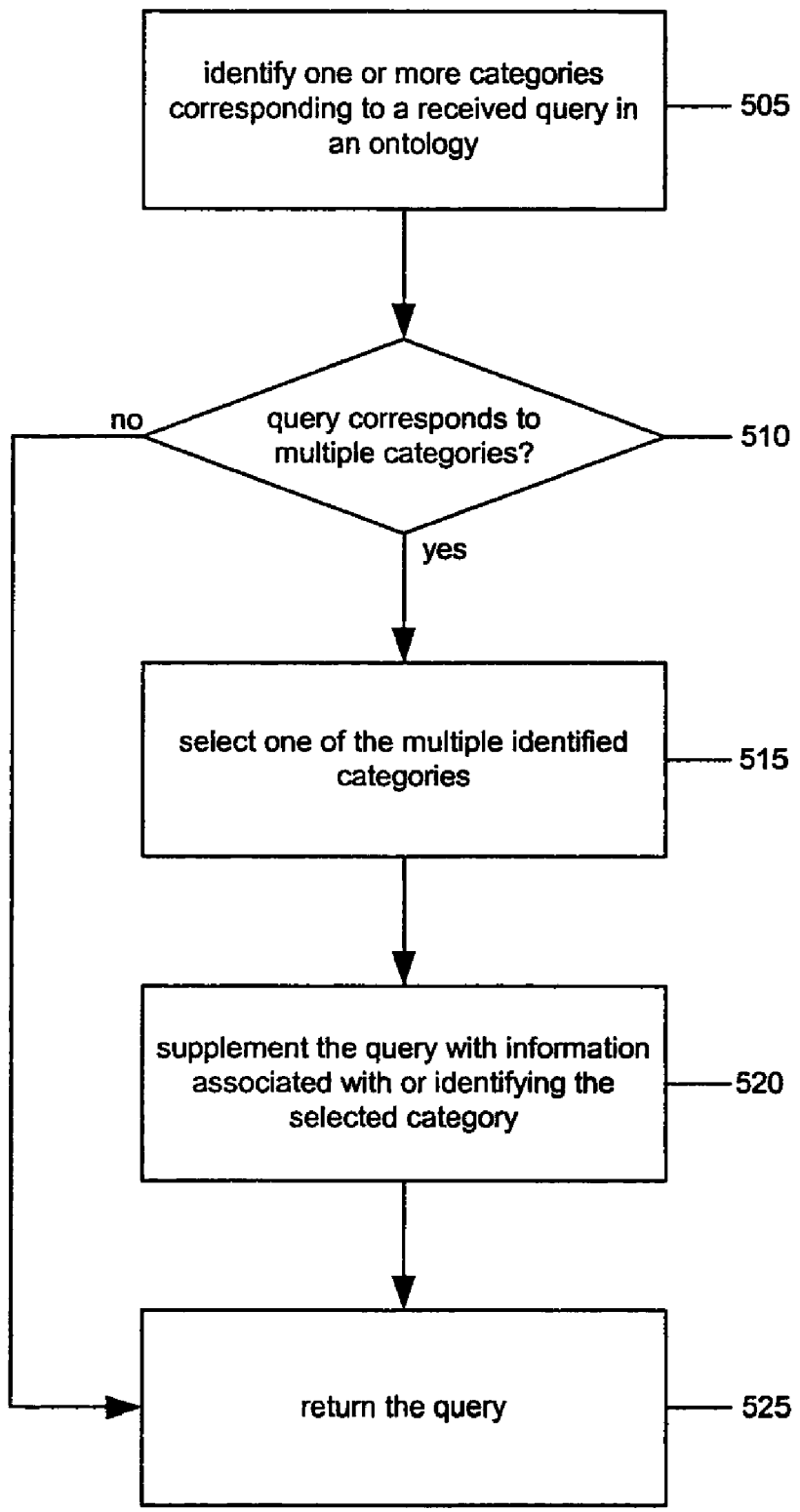
FIG. 5 is a flow chart illustrating an exemplary a process for resolving a query that ambiguously corresponds to multiple categories of query.

Referring to FIG. 5, a process 410 represents one implementation of the operation 410 of FIG. 4, in which a query that corresponds to multiple query categories is resolved to correspond to a single category. The process 410 may be executed by a search interface, such as the search interface 110 of FIG. 1, as part of the process 400 of FIG. 4.

The search interface identifies one or more categories corresponding to a received query in an ontology (505). The ontology may be the ontology 120 of FIG. 1. The search interface may identify the one or more categories using an ontology engine, such as the ontology engine 125 of FIG. 1. More particularly, the search interface provides the received query to the ontology engine, and the ontology engine searches for the received query in the ontology. The ontology engine does so by matching the received query against the queries associated with the categories included in the ontology. If a particular category corresponds to a query that matches the received query, then the particular category corresponds to the received query. The ontology engine may identify all categories included in the ontology that correspond to the received query.

The search interface determines whether the received query corresponds to multiple categories (510). In other words, the search interface 510 determines whether an indication of multiple categories from the ontology that correspond to the received query is received from the ontology engine.

If so, the received query is resolved such that the received query corresponds to only one of the multiple categories (515). More particularly, the search interface selects one of the multiple identified categories (515). In one implementation, selecting the multiple identified categories includes enabling a user that specified the received query to select one of the multiple categories. For example, indications of the multiple categories may be presented to the user on a user interface with which the query was specified. The user may select one of the indications, and the search interface selects the corresponding category as the category to which the query should be resolved.

In another implementation, the search interface may use characteristics of the received query to select one of the multiple identified categories. For example, the search interface may identify one or more categories from the ontology that correspond to a portion of the received query. The categories corresponding to the portion of the received query may be identified in a manner similar to how the categories corresponding to the entire received query were identified. The portion of the received query may correspond to a single category, and the single category may be one of the multiple categories. In such a case, the single category is selected as the category to which the received query should be resolved. For example, the query "eagles receiver" may correspond to a football category and an animals category, while the "receiver" portion of the query may correspond to a football category and an electronics category. The football category may be selected as the category to which the query should be resolved because both the full query and the portion of the query correspond to the football category.

In another implementation, the search interface may use characteristics of the multiple identified categories to select one of the multiple identified categories. For example, an indication of a number of times each of the multiple identified categories has been selected may be maintained, and the one of the multiple categories that has been selected most often may be selected. Other indications of the popularity or appropriateness of the multiple identified categories may be used to select one of the multiple identified categories for the received query. In some implementations, a combination of enabling the user to select one of the multiple categories, identifying categories corresponding to a portion of the query, and identifying characteristics of multiple categories corresponding to the received query may be used to select a category for the received query.

The search interface supplements the query with information associated with or identifying the selected category (520). Supplementing the query with information associated with or identifying the selected category may include formatting the query into a canonical form of the received query for the selected category. The canonical form of the entered query for the selected category is a query associated with the selected category that matches the entered query. When the query does not exactly match a query associated with the selected category, then the canonical form of the query differs from the query. For example, the query "eagles" matches the query "Philadelphia Eagles," which is associated with the football category. Consequently, "Philadelphia Eagles" may be the canonical form of the query "eagles" for the football category.

Alternatively or additionally, the query may be supplemented with one or more keywords associated with the selected category. The keywords represent words or phrases found in a high percentage of search results for queries associated with the selected category. The keywords may be associated with the selected category in the ontology. The query may be supplemented with the keywords such that search results retrieved for the supplemented query include at least one of the keywords.

Supplementing the received query may include reformulating the received query to adhere to a syntax in which queries may be submitted to a search engine to which the supplemented query will be submitted eventually. Each search engine to which the supplemented query may be submitted accepts queries in a particular format, and the query may be reformulated to reflect the particular format of the search engine to which the supplemented query will be submitted. The received query may be supplemented such that the user does not authorize supplementing the query with the associated information, or such that the user does not perceive the supplemented query.

Supplementing the query with the information causes the query to correspond to only the selected category. In other words, supplementing the query resolves the query to the selected category. As a result, the search engine returns the resolved query (525). The returned query may be processed further, or the returned query may be submitted to one or more search engines to retrieve search results for the returned query. If the received query does not correspond to multiple categories in the ontology (510), the received query, by default, corresponds to a single category. As a result, the received query does not need to be resolved and simply may be returned (525).

In some implementations, the categories included in the ontology are arranged as nodes in a directed acyclic graph, as illustrated in FIGS. 2A and 2B. In such implementations, identifying categories that correspond to the received category (505) may include identifying ancestor or child categories of categories included in the ontology with which the received query is associated. In addition, selecting one of the identified categories (515) may include selecting an ancestor or a child category of one of the identified categories. As a result, supplementing the received query with information associated with the selected category (520) may include supplementing the received query with information associated with the selected ancestor or child category.

Figure 6:
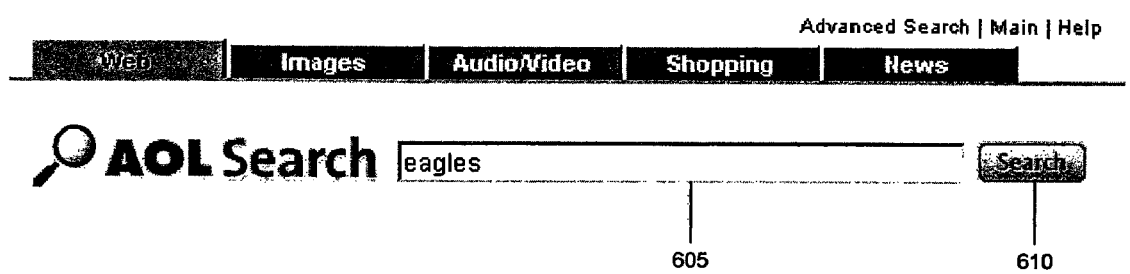
FIG. 6 illustrates an exemplary interface for retrieving search results for a query.

Referring to FIG. 6, a search tool user interface 600 may be presented to a user of the client system 105 of FIG. 1 by the search interface 110 of FIG. 1 when accessed. For example, the search tool user interface 600 may be a web page sent to the client system 105 by the search interface 110 in response to a request from the client system 105. The client system 105 may present the search tool user interface 600 to the user with a web browser running on the client system 105. The search tool user interface includes a text field 605 and a button 610. The user may enter a search query into the search field 605. As illustrated, the user has entered "eagles" in the text field 605 as the search query. Selecting the button 610 after a search query has been entered into the text field 605 submits the search query to the search interface 110 such that search results for the search query may be identified.

Figure 7:
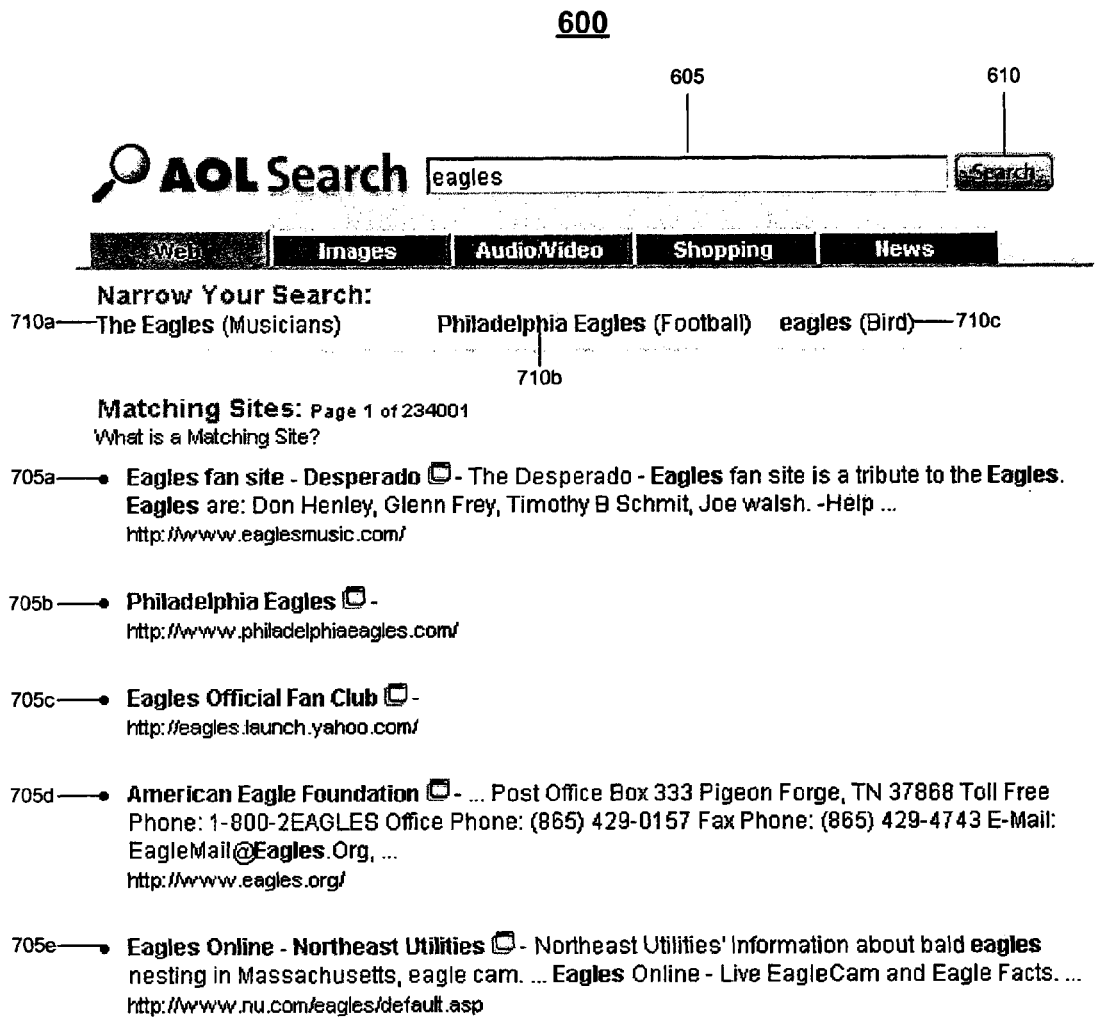
FIG. 7 illustrates another exemplary interface that relates to the FIG. 6 interface but that is made perceivable after search results for a specified query have been retrieved.

Referring to FIG. 7, the search tool interface 600 displays search results 705*a*-705*e* that have been retrieved for the search query entered in the text field 605 after the submit button 610 has been selected. In addition, category identifiers 710*a*-710*c* identify categories in the ontology 125 of FIGS. 1, 2A and 2B corresponding to the search query.

The category identifiers 710*a*-710*c* indicate that the search query corresponds to multiple categories in the ontology 125. For example, one of the queries corresponding to a musicians category in the ontology 125 matches the search query, as indicated by the category identifier 710*a*. In addition, the category identifier 710*b* indicates that a query corresponding to a football category in the ontology 125 matches the search query, and the category identifier 710*b* indicates that a query corresponding to a bird category in the ontology 125 matches the search query.

The category identifiers 710*a*-710*c* also may indicate canonical forms of the query entered in the text field 605 for the corresponding category. The canonical form of the entered query for a particular category is a query associated with the particular category that matches the entered query. For example, the entered query matches the query "The Eagles" that is associated with the musicians category, so "The Eagles" is the canonical form of the entered query for the musicians category. Similarly, "Philadelphia Eagles" is the canonical form of the entered query for the football category, and "eagles" is the canonical form of the entered query for the bird category.

The search results 705*a*-705*e* represent search results that were retrieved for the search query before the search query was disambiguated. In other words, the search results 705*a*-705*e* were retrieved for the search query before the search query was supplemented with information associated with a category from the ontology 125 that the user intended for the search query. As a result, the search results 705*a*-705*e* represent search results that are representative of the multiple categories. For example, the search results 705*a* and 705*c* are representative of the musicians category, the search result 705*b* is representative of the football category, and the search results 705*d* and 705*e* are representative of the bird category.

One of the category identifiers 710*a*-710*c* may be selected by the user to indicate that the corresponding category was intended for the search query. For example, the user may select the category identifier 710*a* to retrieve search results relating only to musicians that match the search query. The user may select the category identifier 710*b* to retrieve search results relating only to football that match the search query, and the user may select the category identifier 710*c* to retrieve search results relating only to birds that match the search query. Moreover, a user interface may enable selection of more than one category, in response to which results corresponding to each selected category may be interpreted seamlessly or visually distinguished through a visual indicator or screen position.

Referring to FIG. 8, the search tool user interface 600 displays search results 805a-805e, an original query indicator 810, a selected category indicator 815, and an available category indicator 820 after the category identifier 710a of FIG. 7 has been selected. When the category identifier 710a was selected, the query entered in the text field 605 was supplemented with information associated with the category associated with the category identifier 710a. For example, the query may be reformatted into the canonical form of the query for the category selected with the category identifier 710a. More particularly, the musicians category was selected with the category identifier 710a, so the query was reformatted into "The Eagles," which is the canonical form of the query for the musicians category. In addition, the query may be supplemented with one or more keywords associated with the musicians category in the ontology 125. Such reformatting and supplementing may be indicated in the text field 605.

As a result of the disambiguation of the query by supplementing the query with information associated with the musicians category, the search results 805a-805e are all representative of the musicians category. More particularly, the search results 805a-805e represent Internet resources that match the supplemented query, which is representative of only the musicians category in the query ontology 125. Therefore, the search results 805a-805e all relate to musicians named "The Eagles."

The indicators 810-820 identify steps taken to retrieve the search results 805a-805e, which are representative of only one query category. More particularly, the indicators 8210-820 identify the original query, the categories to which the original query corresponds, and the category to which the original query has been resolved. The indicators 810-820 may allow navigation through the steps such that the original query may be disambiguated in different manner, or such that search results may be retrieved without first disambiguating the original query.

The original query indicator 810 identifies the query that was originally submitted before the query was disambiguated. For example, the query indicator 810 indicates that the original query was "eagles," because that query was entered in the text field 605 of FIG. 6. In one implementation, the query listed in the original query indicator 810 may be a link that may be selected to retrieve search results for the original query without the original query being disambiguated. For example, selecting the query listed in the original query indicator may cause search results that are similar to the search results 705a-705e of FIG. 7 to be presented and displayed.

The selected category indicator 815 identifies a category to which the query was resolved. More particularly, the selected category indicator 815 identifies one of the multiple categories to which the original query corresponds whose corresponding category identifier was selected. For example, the selected category indicator 815 indicates that the original query has been resolved to the musicians category as a result of the category indicator 710a of FIG. 7 being selected.

The available category indicator 820 identifies others of the multiple categories to which the original query corresponds whose corresponding category identifiers were not selected. For example, the available category indicator 820 indicates that the original query was not resolved to the football category or to the birds category because the corresponding category indicators 710b and 710c of FIG. 7 were not selected. Each of the categories identified by the available category indicator 820 may be a link that may be selected to retrieve search results relating to that particular category. In other words, each of the categories listed in the available category indicator 820 may be similar to one of the category identifiers 710a-710c of FIG. 7.

In other implementations of the search tool user interface 600 of FIGS. 6-8, multiple sets of search results for the query may be presented before one of the category identifiers 710a-710c has been selected. Each of the category identifiers 710a-710c may be associated with one of the sets of the search results. The search results associated with a category identifier represent one or more search results that are representative of the query category corresponding to the category-identifier. One of the sets of search results may include search results that were retrieved before the search query was disambiguated. The multiple sets of search results may help the user to identify a category that was intended for the query. Selecting the category identifier corresponding to the intended category may cause additional search results that are representative of the intended category to be presented, as is illustrated in FIG. 8.

Figure 9:
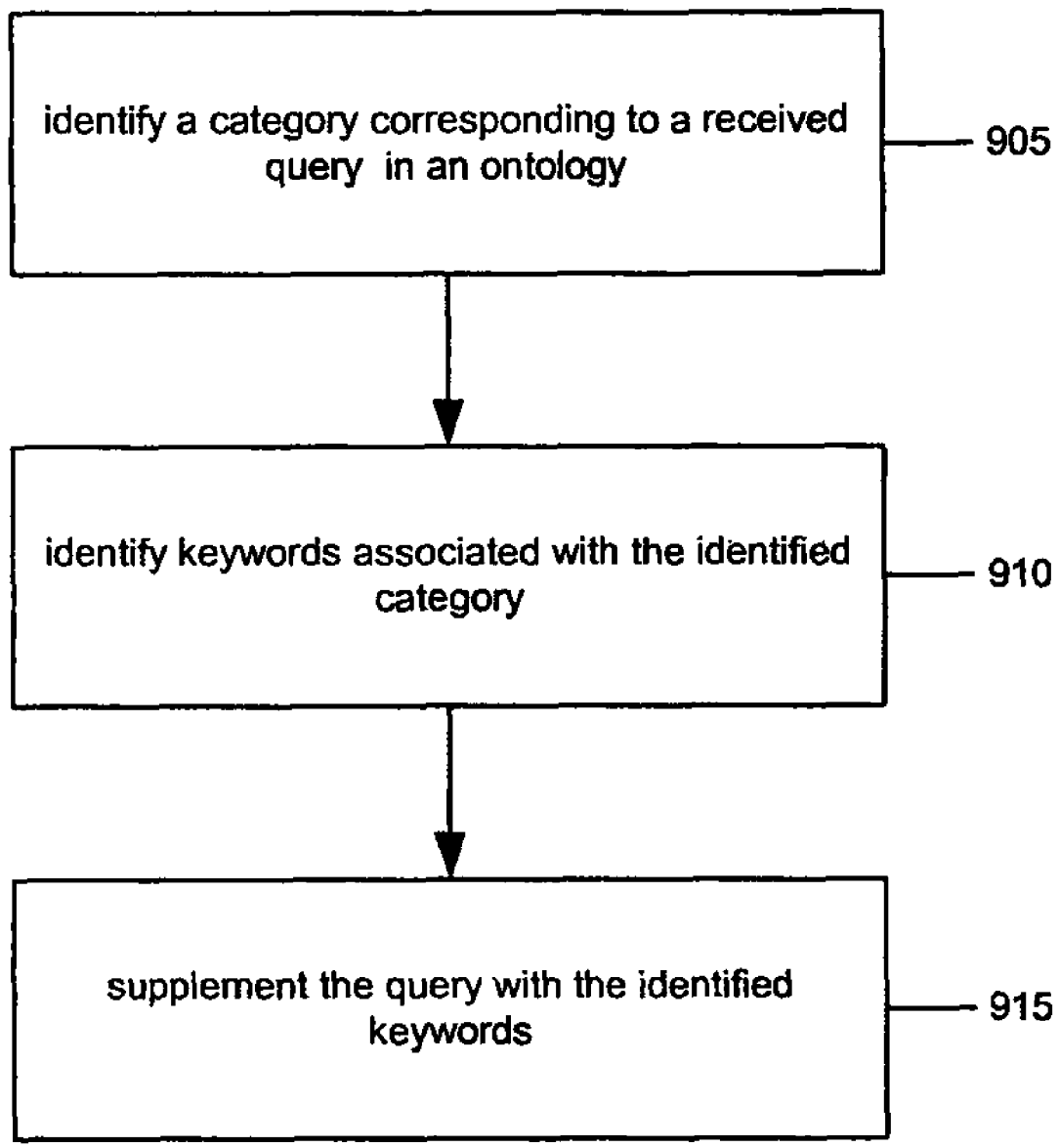
FIG. 9 is a flow chart illustrating an exemplary process for supplementing a query with keywords associated with a query category corresponding to the query.

Referring to FIG. 9, a process 415 represents one implementation of the operation 415 of FIG. 4, in which a query is supplemented with keywords associated with a category to which the query corresponds. The process 415 may be executed by a search interface, such as the search interface 110 of FIG. 1, as part of the process 400 of FIG. 4.

The search interface identifies a category corresponding to a received query in an ontology (905). The category corresponding to the received query may be identified in a manner similar to the process 410 of FIG. 5. For example, the search interface may identify the category using an ontology engine that interfaces with the ontology, such as the ontology engine 120 of FIG. 1. If the received query corresponds to multiple categories in the ontology, one of the categories may be selected (manually by the user or automatically without user control) for the received query, particularly when the received query has not been resolved with the process 410 of FIG. 5 prior to execution of the process 415. In implementations where the categories included in the ontology are arranged as nodes in a directed acyclic graph, identifying a category that corresponds to the received query may include identifying an ancestor or a child category of a category included in the ontology with which the received query is associated.

The search interface identifies one or more keywords associated with the identified category (910). The keywords represent words or phrases found in a high percentage of search results for queries associated with the selected category. In one implementation, the keywords are associated with the selected category in the ontology, as illustrated in FIGS. 3A and 3B. In such an implementation, the search interface uses the ontology engine to access the keywords from the ontology. In another implementation, the keywords may be maintained in an external mapping that relates query categories to keywords. Such a mapping may be maintained by the search interface or the ontology engine. In such an implementation, identifying the keywords may include identifying the keywords from the external mapping.

The search interface supplements the received query with the identified keywords (915). The query may be supplemented with the keywords such that search results retrieved for the supplemented query include at least one of the keywords. Supplementing the query with the keywords increases the chances that search results retrieved for the supplemented query are representative of the identified category. A high percentage of search results for queries of the identified category include the keywords, so search results that include one or more of the keywords are likely to be representative of the identified category. In one implementation, prior to supplementing the query with the identified keywords, the identified keywords may be presented to the user such that the user may select which of the identified keywords will be used to supplement the received query. The supplemented query may be reformulated to adhere to a syntax in which queries may be submitted to a search engine to which the supplemented query will be submitted. The received query may be supplemented such that the user does not authorize supplementing the query with the keywords, or such that the user does not perceive the supplemented query.

Maintaining keywords for query categories may be more advantageous than maintaining keywords for individual queries, particularly when the number of categories is significantly smaller than the number of individual queries. Maintaining keywords for query categories instead of for individual queries reduces the storage space required for the keywords.

Figure 10:
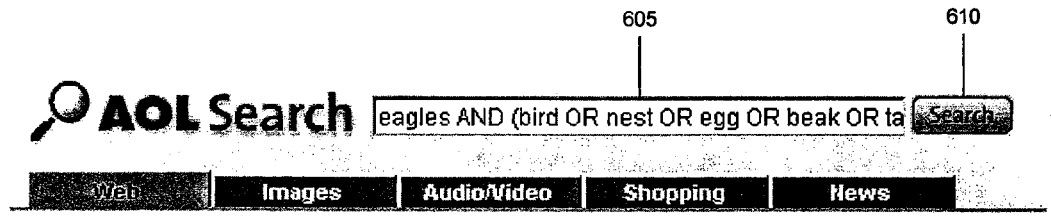
FIG. 10 illustrates another exemplary interface that relates to the FIG. 6 interface but that is made perceivable after search results for a query that has been supplemented with keywords have been retrieved.

Referring to FIG. 10, the search tool user interface 600 displays search results 1005a-1005e that were retrieved for a query entered in the text field 605 after the query was supplemented with one or more keywords associated with a category that was intended for the query. The search tool user interface 600 illustrated in FIG. 10 may be presented after the button 610 of the search tool user interface 600 illustrated in FIG. 6 has been selected, if the search query entered into the text field 605 of FIG. 6 corresponds to only one category. Alternatively, if the search query entered in the text field 605 corresponds to multiple categories, then the search tool user interface 600 illustrated in FIG. 10 may be presented after one (or more) of the category identifiers 710a-710c of FIG. 7 has been selected.

The search results 1005a-1005e are representative of the bird category of the ontology 125 because the query entered in the text field 605 has been supplemented with keywords associated with the bird category. The keywords may be added to the query as a result of the query corresponding only to the bird category, or as a result of the selection of the category identifier 710c of FIG. 7, which corresponds to the bird category. In addition to including the original query "eagles," the search results 1005a-1005e also may include one or more of the keywords that were used to supplement the original query.

The keywords with which the query has been supplemented may or may not be made perceivable to the user from which the query was received. As a result, the query may or may not be modified within the text field 605, though the query has been modified within the text field in the illustrated search tool user interface 600.

Figure 11:
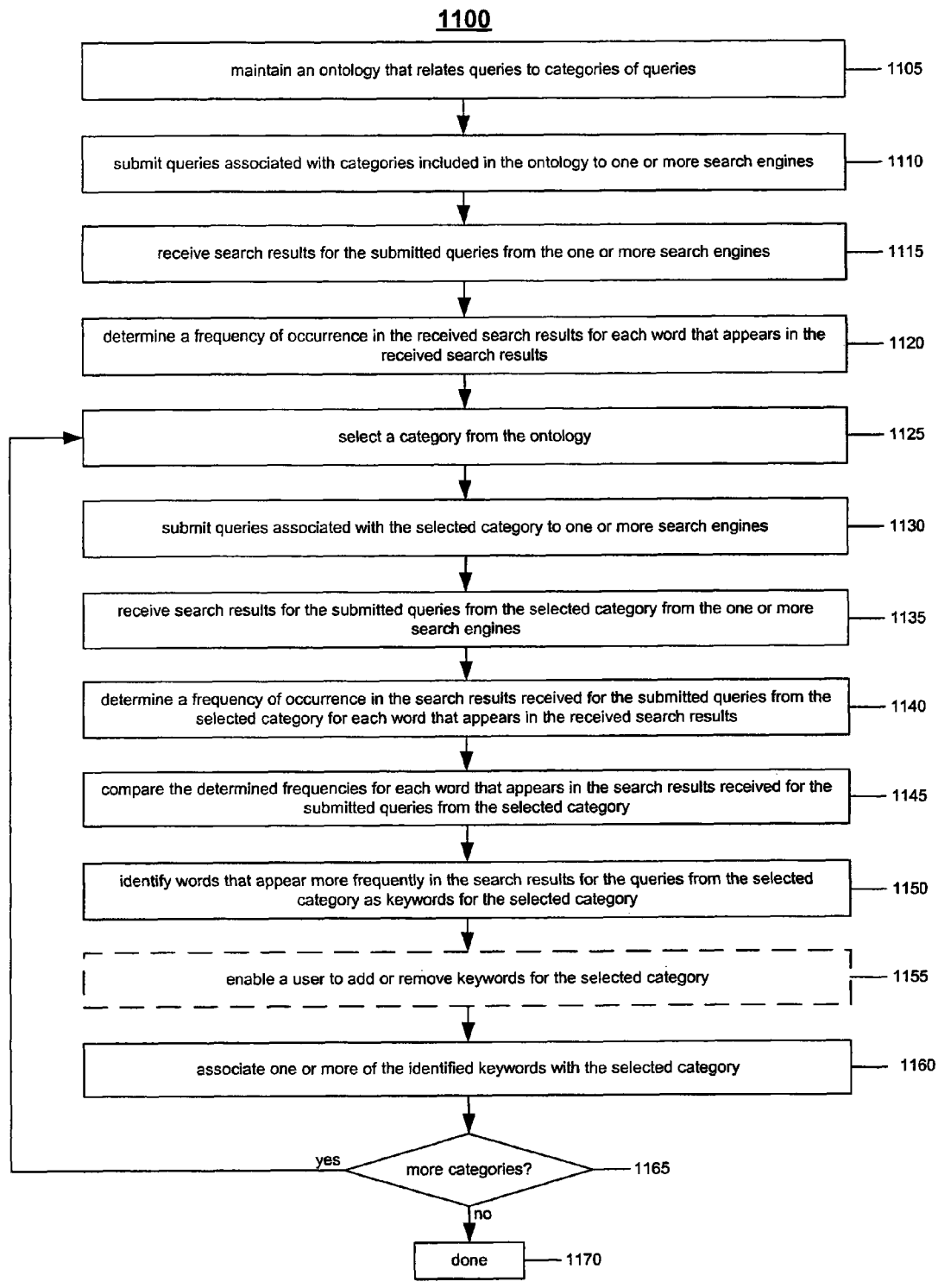
FIG. 11 is a flow chart illustrating an exemplary process for identifying keywords for the query categories included in the ontology of FIGS. 2A and 2B.

Referring to FIG. 11, a process 1100 is used to associate keywords with query categories included in a query ontology. The process 1100 identifies words or phrases that appear in a high percentage of search results for queries from a particular category in the query ontology and associates the identified words with the particular category as keywords for the particular category. The keywords are used to supplement queries that correspond to the particular category such that search results retrieved for the particular category are representative of the particular category. The process 1100 is executed by the ontology engine 120 to prepare the ontology 125, both of FIG. 1.

The process 1100 begins when an ontology that relates queries to query categories is maintained and/or accessed (1105). For example, an ontology that is similar to the ontology 125 of FIGS. 1, 2A, and 2B is maintained.

The ontology engine submits queries associated with categories included in the ontology to one or more search engines (1110). In one implementation, all queries included in the ontology are submitted to the one or more search engines. In another implementation, a particular number of queries from each of the categories included in the ontology are submitted to the one or more search engines. In general, any number of queries included in the ontology may be submitted, particularly if the submitted queries evenly represent the categories included in the ontology.

Furthermore, in some implementations, the queries may be submitted to all available search engines or to a subset of the available search engines. For example, the queries may be submitted to a general search engine from which many types of search results may be retrieved. Alternatively, the queries may be submitted to multiple search engines from which specialized types of search results may be retrieved. As another example, the queries may be submitted both to general and specialized search engines. In general, the queries may be submitted to any set of search engines, particularly if different types of search results may be retrieved evenly from the search engines. Search results for the submitted queries are received from the one or more search engines to which the queries were submitted (1115).

The ontology engine determines a frequency of occurrence in the received search results for each word that appears in the received search results (1120). The ontology engine also may determine a frequency of occurrence in the received search results for one or more phrases that appear in the received search results. Determining the frequency of occurrence for a word or a phrase may include determining a probability that the word or the phrase appears in one of the received search results. Such a probability may be defined as the ratio of the number of the received search results that include the word or the phrase to the number of the received search results. Alternatively, determining the frequency of occurrence for a word or a phrase may include determining a number of the received search results that include the word or the phrase. In one implementation, the frequencies of occurrence for the words or the phrases appearing in the received search results may be determined using only a subset of the retrieved search results. For example, a particular number of the search results that most closely match each of the submitted queries may be used to determine the frequencies.

The determined frequencies of occurrence represent a base statistical model of word or phrase frequency from a random or general collection of search results. The determined frequencies will be compared to frequencies determined for search results for queries from a particular category in the query ontology. Words or phrases with higher frequencies in search results for queries from the particular category will be identified as keywords for the particular category.

The ontology engine then selects a category from within the ontology (1125). The ontology engine submits queries associated with the selected category to one or more search engines (1130). Some or all of the queries associated with the selected category may be submitted to the one or more search engines. The queries may be submitted to the same search engines to which the queries from the categories were previously submitted. Search results for the submitted queries from the selected category are received from the one or more search engines (1135).

The ontology engine determines a frequency of occurrence in the search results received for the submitted queries from the selected category for each word that appears in the received search results (1140). The ontology engine also may determine a frequency of occurrence in the received search results for one or more phrases that appear in the received search results. The frequencies may be determined in a manner similar to how the frequencies were previously determined using search results received for the queries included in the ontology.

For each word that appears in the received search results, the ontology engine compares the frequency of occurrence in the search results for the queries from the selected category to the frequency of occurrence in the search results for the queries from the categories (1145). The ontology engine also may compare the frequencies of occurrence for the phrases that appear in the received search results. In general, comparing the two frequencies for a particular word or phrase indicates whether the particular word or phrase appears more frequently in the search results for the queries from the selected category. Comparing the two frequencies also may indicate whether the particular word or phrase appears with relatively equal frequency in both the search results for the queries from the selected category and the search result for the queries from the categories. Comparing the two frequencies may include identifying a weighting factor for the word or the phrase. The weighting factor indicates the relative difference between the two frequencies. In one implementation, a high weighting factor may indicate that the word or the phrase occurs more frequently in the search results for the queries from the selected category than in the search results for the queries from the categories. On the other hand, a low weighting factor may indicate that the word or the phrase does not occur more frequently in the search results for the queries from the selected category than in the search results for the queries from the categories.

Words that appear more frequently in the search results for the queries from the selected category of the query ontology are identified as keywords for the selected category (1150). In addition, one or more phrases that appear more frequently in the search results for the queries from the selected category of the query ontology may be identified as keywords for the selected category. The identification of the keywords may be based on the weighting factors of the words or the phrases that appear in the received search results. In one implementation, a particular number of words or phrases with the highest weighting factors are identified as the keywords. In another implementation, words or phrases with weighting factors that exceed a threshold weighting factor are identified as the keywords.

A user may be enabled to add or remove keywords for the selected category (1155). For example, the user may access the ontology engine with a client system, such as the client system 105 of FIG. 1, to add or remove keywords for the selected category. Alternatively, the user may access the ontology engine directly to specify the keywords. The user that adds or removes keywords for the selected category may be an editor or an administrator of the ontology and the ontology engine. Enabling the user to review the automatically identified keywords enables the user to determine that the best keywords have been identified for the selected category. The user may remove keywords that are not the best keywords for the selected category. The user also may add keywords that have not been automatically identified as the best keywords for the selected category. In some implementations, the user may be prevented from removing one or more of the keywords. For example, the user may be prevented from removing the keyword for which the best weighting factor has been identified. As a result, the keyword with the best weighting factors always may be associated with and used for the selected category.

The ontology engine associates one or more of the identified keywords with the selected category (1160). In one implementation, the keywords are stored with the selected category in the query ontology, as is illustrated in FIGS. 2A and 2B. In another implementation, the keywords are associated with the selected category in a mapping of categories to keywords for the categories that is external to the query ontology. Such a mapping may be maintained by the ontology engine.

The ontology engine determines whether keywords have been identified for all categories included in the query ontology, or whether keywords need to be identified for more categories (1165). If so, then the ontology engine selects one of the categories for which keywords have not already been identified (1125), submits queries associated with the selected category to one or more search engines (1130), and receives search results for the submitted query (1135). Frequencies of word or phrase occurrence are determined (1140), and the frequencies are compared to previously determined frequencies of occurrence of words or phrases that appear in search results for the queries from the categories (1145). Based on the comparison, keywords for the selected category are identified (1150), modified by a user (1155), and associated with the selected category (1160). In this manner, keywords are identified sequentially for each category included in the query ontology, until keywords have been identified for all categories included in the query ontology, at which point the process 1100 is done (1170).

Figure 12:
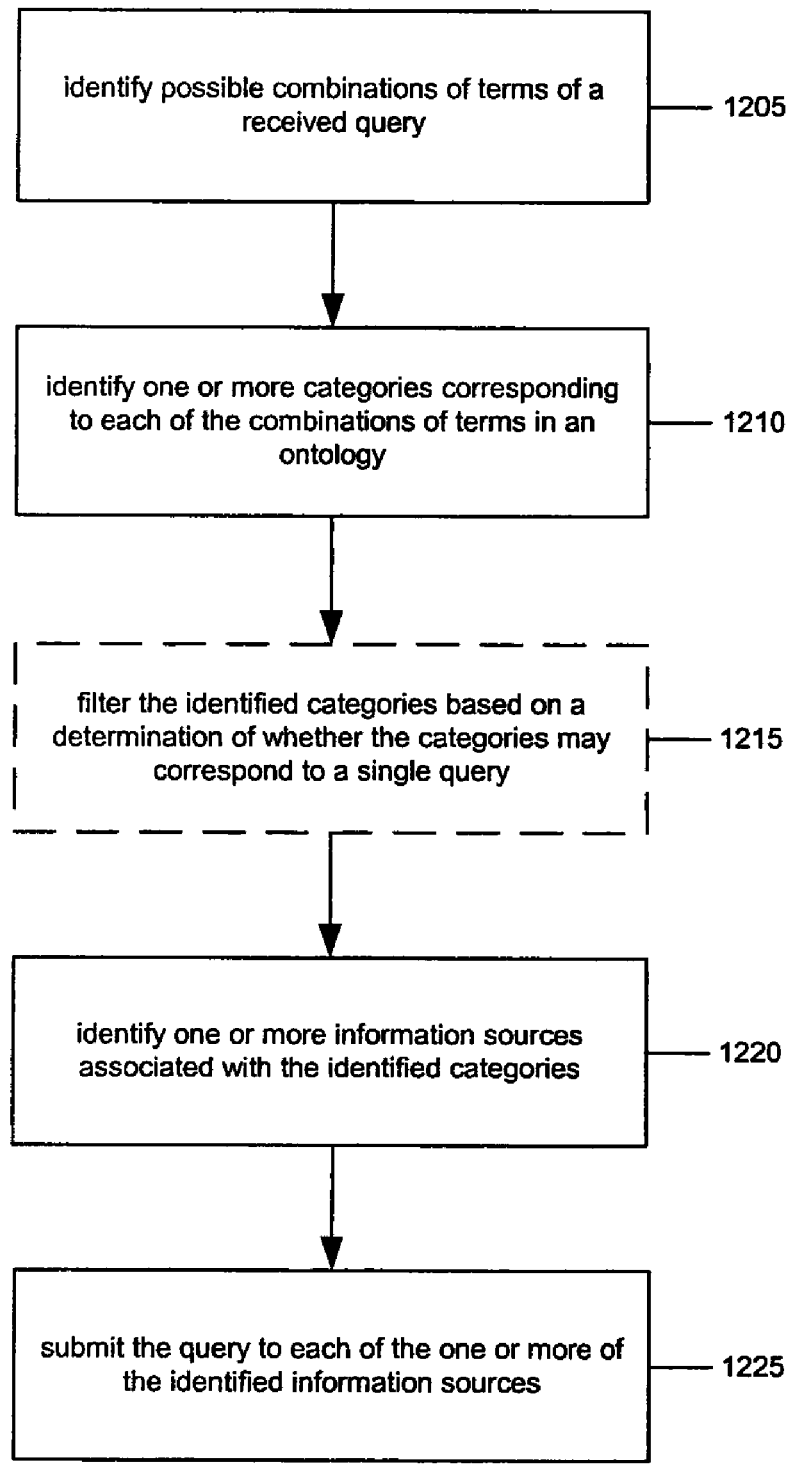
FIG. 12 is a flow chart illustrating an exemplary process for submitting a query to information sources corresponding to a query category associated with the query.

Referring to FIG. 12, a process 420 represents one implementation of the operation 420 of FIG. 4, in which a query is submitted to information sources associated with a category to which the query corresponds. The process 420 may be executed by a search interface, such as the search interface 110 of FIG. 1, as part of the process 400 of FIG. 4.

The search interface identifies possible combinations of terms from a received query (1205). For example, if the received query includes three terms, the possible combinations may include the first term, the second term, the third term, the first and second terms, the second and third terms, and the first, second, and third terms. In this and typical implementations, the possible combinations of terms from the received query represent subsets of consecutive terms from the received query, and the order of the consecutive terms is maintained. Such implementations are advantageous because the order and location of the terms in the query typically affect the subject matter, and consequently the category, of the query. For example, for the query "wooden Venetian blind, the combination "Venetian blinds" may have more relevance to the meaning of the query than the combination "blind Venetian" or the combination "wooden blind." Furthermore, limiting the number of allowable combinations of the query terms limits the number of categories that may correspond to the combinations, which may limit the number of information sources to which the search query is submitted. However, in other implementations, the possible combinations also may include subsets of nonconsecutive terms from the received query (for example, in the initial example of three terms, the first and third terms), and the terms in each of the possible combinations may be permuted to identify additional combinations. Identifying the possible combinations of terms of the received query may be referred to as n-gramming the received query.

The search interface identifies one or more categories corresponding to each of the possible combinations of the terms in an ontology (1210). The categories corresponding to each of the combinations may be identified in a manner similar to the process 410 of FIG. 5. For example, the search interface may identify the one or more categories for the combination using an ontology engine that interfaces with the ontology, such as the ontology engine 120 of FIG. 1. In implementations where the categories included in the ontology are arranged as nodes in a directed acyclic graph, identifying the one or more categories that correspond to the combination may include identifying ancestor or child categories of categories included in the ontology with which the combination is associated. The categories corresponding to each of the possible combinations represent categories for the entire query.

The categories corresponding to the combinations of terms of the query may be filtered based on a determination of whether the categories may correspond to a single query (1215). For example, an indication of whether a subset of the categories has corresponded to a previously received query may be used to determine whether the categories should be filtered. Alternatively or additionally, a probability that a subset of the categories corresponds to a single query may be used to determine whether the categories should be filtered. The probability may be based on categories identified for previously received queries. For example, the combinations of terms from the query may correspond to three categories. The three categories together may not have corresponded to a previously received query, but two of the categories may have a high probability of both corresponding to a single query. As a result, the two categories may be identified as categories for the query, and the third category may be eliminated. Reducing the number of categories that correspond to the query may reduce the number of information sources to which the categories are submitted.

The search interface identifies one or more information sources associated with the identified categories that have not been eliminated (1220). The information sources represent domains from which a high percentage of search results for queries corresponding to the identified categories are identified. The information sources represent experts on the identified categories and all corresponding queries and keywords in general, rather than experts on any particular query associated with the identified categories (although a particular expert may provide expertise on both). In one implementation, the information sources are associated with the identified categories in the ontology, as illustrated in FIGS. 3A and 3B. In such an implementation, the search interface uses the ontology engine to access the information sources from the ontology. In another implementation, the information sources may be maintained in an external mapping that relates query categories to information sources for the queries. Such a mapping may be maintained by a source selection module, such as the source selection module 130 of FIG. 1. In such an implementation, identifying the information sources may include identifying the information sources from the external mapping.

The search interface submits the received query to the identified information sources (1225). Submitting the query to the identified information sources may include submitting the query to the identified information sources such that the information sources may identify search results for the query from the information sources. Submitting the query to the identified information sources also may include submitting the query to one or more search engines with an instruction to return search results from only the identified information sources. Submitting the query to the identified information sources increases the chances that search results retrieved for the query are representative of the category of the query. A high percentage of search results for queries from the categories corresponding to the query are identified from the identified information sources, so search results from the identified information sources are likely to be representative of the categories corresponding to the query.

Identifying information sources that correspond to one of the combinations of terms from the query as appropriate for the query eliminates the need to relate all possible queries to query categories. The number of possible queries prohibits identifying a category for each of the queries. Furthermore, the set of possible queries is constantly changing. However, the number of terms that may be used to construct queries allows for one or more categories to be identified for each of the terms, and the set of query terms is relatively fixed. Under the assumption that the categories of a query are the categories of terms of the query, such classification of query terms enables classification of an otherwise prohibitively large number of queries.

Submitting queries to a subset of the available search engines, instead of to all of the available search engines, may be advantageous because most of the available search engines may not provide desirable search results for each query. Furthermore, network resources are preserved because communication occurs only between a limited number of systems. In general, a smaller number of search engines to which a query is submitted corresponds to a larger amount of network resources that are preserved, so a small subset of search engines that return high quality search results may be used to preserve a large amount of network resources. In addition, identifying information sources for query categories may be better than identifying information sources for individual queries, or for individual query terms. This may be particularly true when the number of categories is significantly smaller than the number of individual queries. Maintaining indications of information sources for query categories instead of for individual queries or query terms reduces the storage space required for the indications of the information sources.

Figure 13A:
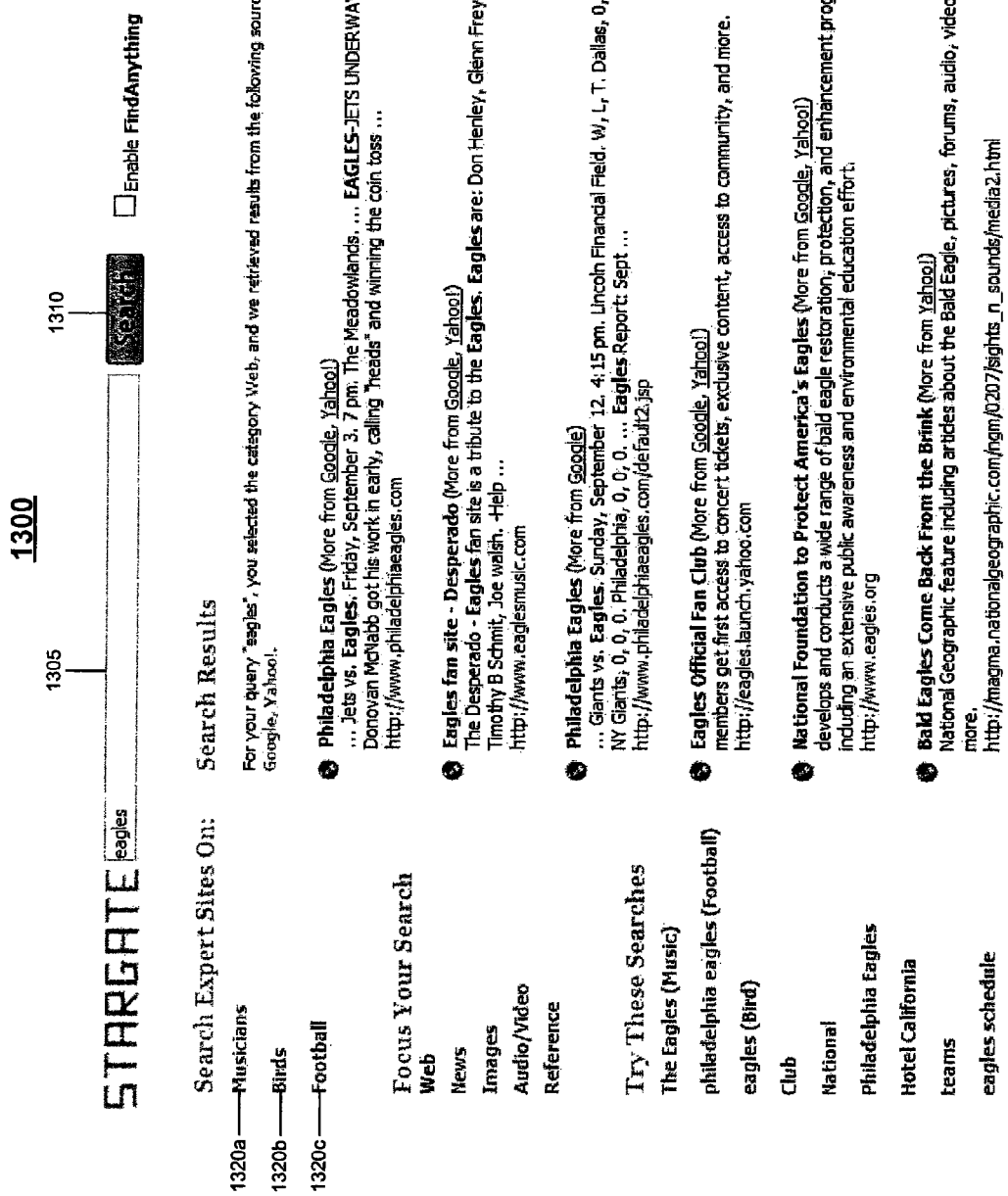
FIG. 13A illustrates another exemplary interface for retrieving search results for a query.

Referring to FIG. 13A, a search tool user interface 1300 is similar to the search tool user interface 600 of FIGS. 6, 7, 8, and 10. The search tool user interface 1300 includes a text field 1305 into which a user may enter a search query, and a button 1310 that may be selected to retrieve search results 1315*a*-1315*f* for the entered query. As illustrated, the user has entered "eagles" in the text field 1305, and the button 1310 has been selected to retrieve the search results 1315*a*-1315*f*. The search tool user interface 1300 also includes category identifiers 1320*a*-1320*c* that identify query categories with which the entered query is associated.

The category identifiers 1320*a*-1320*c* indicate that the query entered in the text field 1305 is associated with multiple categories in the ontology 125. More particularly, the query is associated with a musicians category, as indicated by the category identifier 1320*a*, a birds category, as indicated by the category identifier 1320*b*, and a football category, as indicated by the category identifier 1320*c*. The search results 1315*a*-1315*f* may represent search results that were retrieved for the search query before the search query was disambiguated to correspond only to one of the multiple categories, for example, with the process 410 of FIG. 5. As a result, all of the search results 1315*a*-1315*f* may not have been retrieved from information sources corresponding to a particular one of the multiple categories. Instead, the search results 705*a*-705*e* are from information sources that correspond to more than one of the multiple categories, or that do not correspond to any of the multiple categories. As a result, the search results 1315*a*-1315*e* may be representative of the multiple categories. For example, the search result 1315*a* and 1315*c* are representative of the football category, the search results 1315*b* and 1315*d* are representative of the musicians category, and the search results 1315*e* and 1315*f* are representative of the bird category.

One of the category identifiers 1320a-1320c may be selected by the user to indicate that the corresponding category was intended for the search query. For example, the user may select the category identifier 1320a, 1320b, or 1320c to indicate that the musicians category, the birds category, or the football category, respectively, was intended for the query. The query then may be submitted to one or more information sources corresponding to the intended category such that the search results 1305a-1305f are retrieved from the information sources.

Figure 13B:
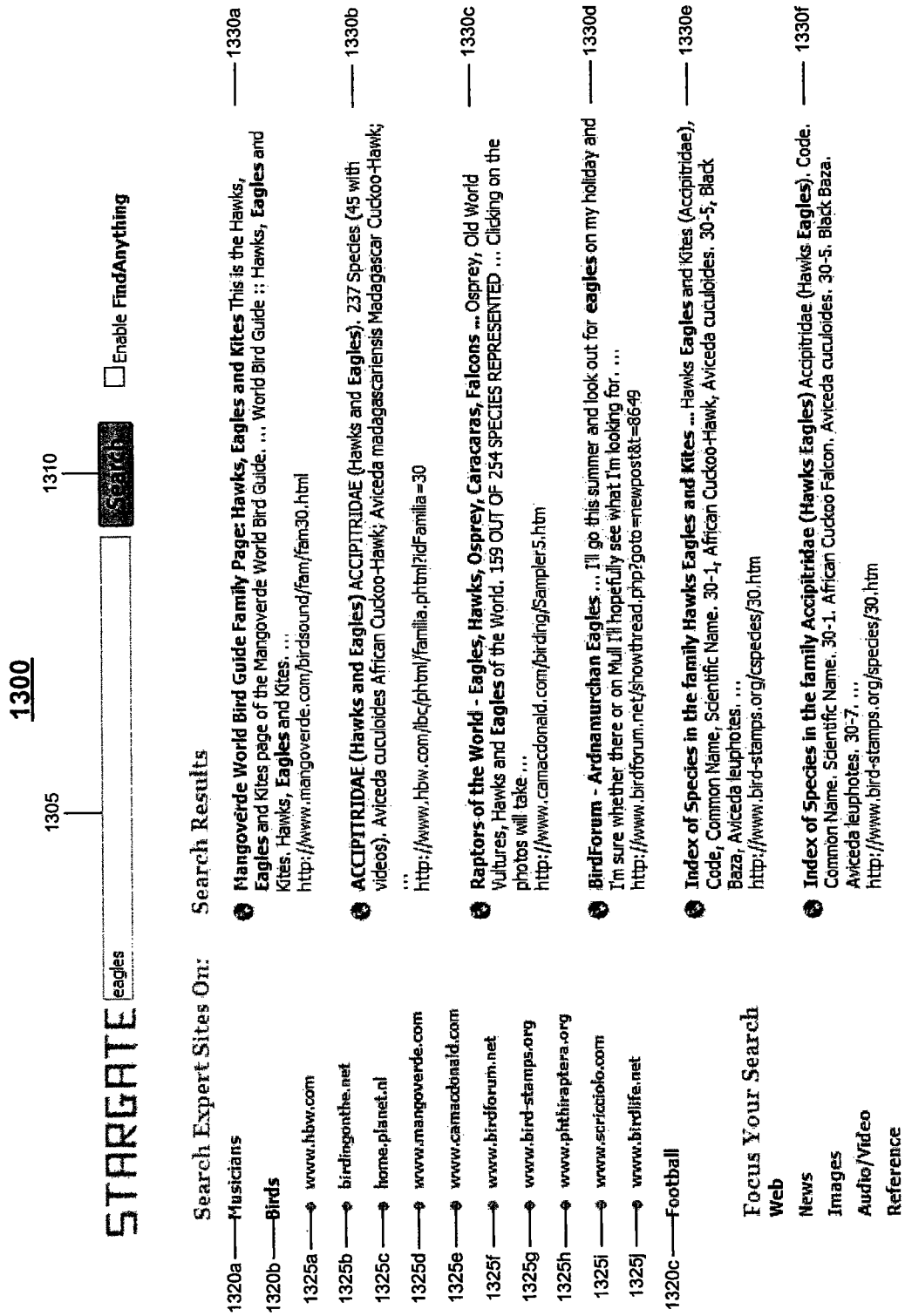
FIG. 13B illustrates another exemplary interface that relates to the FIG. 13A interface but that is made perceivable after a query is submitted to one or more expert domains corresponding to a category of the query.

Referring to FIG. 13B, the search tool user interface 1300 displays information source indicators 1325a-1325j and search results 1330a-1330f after the category identifier 1320b of FIG. 13A has been selected. The information source indicators 1325a-1325j identify information sources corresponding to the birds category, which was selected for the query through selection of the category identifier 1320b. For example, each of the information source indicators 1325a-1325b corresponds to an expert domain listed in the expert domain list 320a of FIG. 3A for the exemplary birds category 205m from the exemplary ontology 125 of FIGS. 2A and 2B.

Each of the search results 1330a-1330f has been retrieved from one of the information sources for which an information source indicator 1325a-1325j is displayed. Because the search results 1330a-1330f are retrieved from one or more of the information sources corresponding to the birds category, the search results 1330a-1330f are all representative of the birds category. Furthermore, selecting one of the information source indicators 1325a-1325j may cause search results only from the corresponding information source to be retrieved and displayed to the exclusion or apparent visual preference or relative order with respect to results from other of the sources, which further ensures that the search results are representative of the birds category in the above example.

After selection of the category identifier 1320b, the category identifiers 1320a and 1320c may be selected to retrieve search results for the query from information sources corresponding to the musicians category and the football category, respectively. Selecting one of the category identifiers 1320a and 1320c may cause one or more information source indicators for information sources corresponding to the selected category to be displayed. Each of the information source indicators may be selected to cause search results only from the corresponding information source to be retrieved and displayed.

In other implementations of the search tool user interface 1300 of FIGS. 13A and 13B, multiple sets of search results for the query may be presented before one of the category identifiers 1320a-1320c has been selected. Each of the category identifiers 1320a-1320c may be associated with one of the sets of the search results. The search results associated with a category identifier represent one or more search results that have been retrieved from one or more information sources corresponding to the query category corresponding to the category identifier. One of the sets of search results may include search results that were retrieved before the search query was disambiguated such that the search results may have been retrieved from multiple domains that do not necessarily correspond to a particular query category. The multiple sets of search results may help the user to identify a category that was intended for the query. Selecting the category identifier corresponding to the intended category may retrieve additional search results from one or more information sources corresponding to the query category for presentation, as is illustrated in FIG. 13B.

Figure 14:
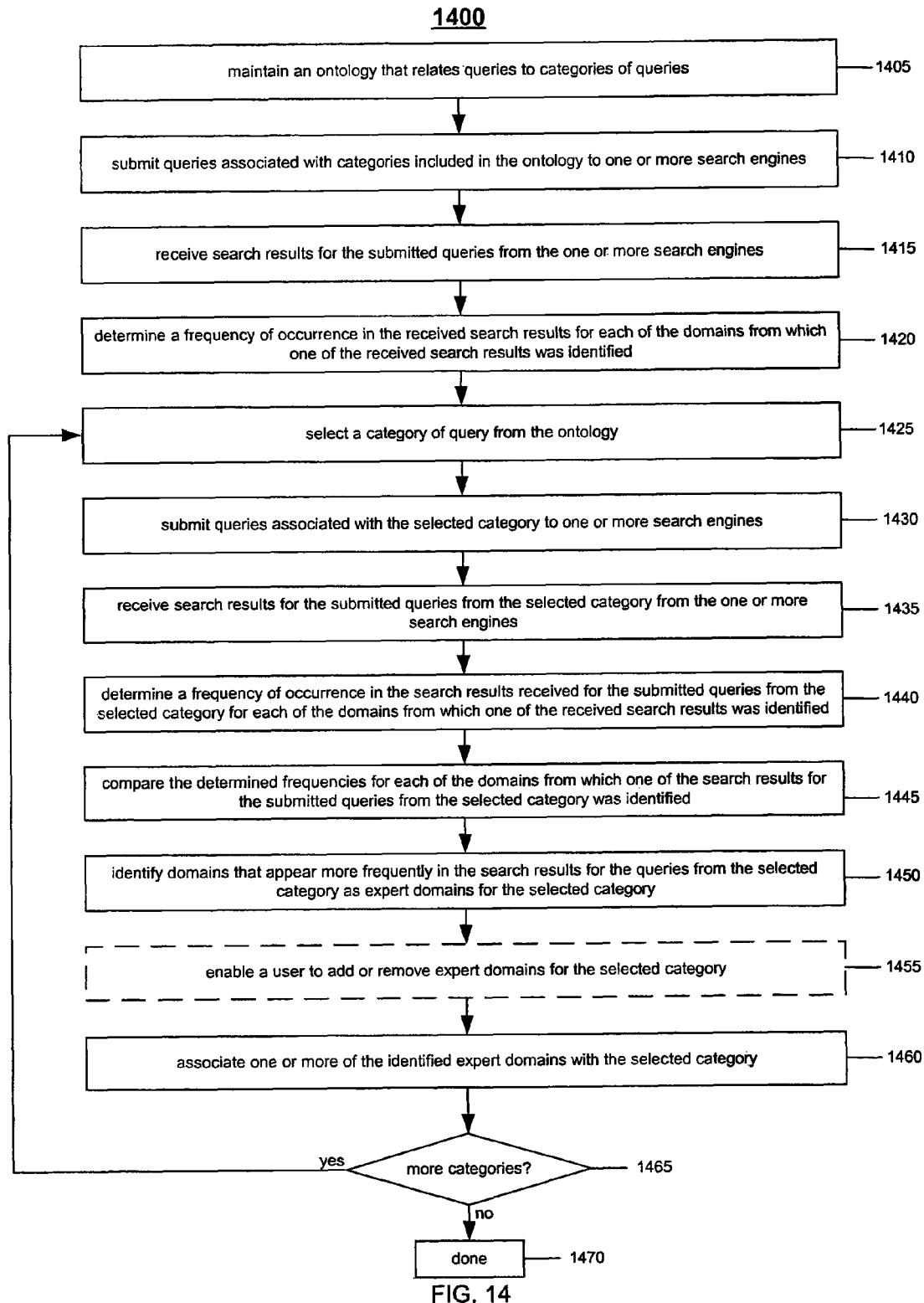
FIG. 14 is a flow chart illustrating an exemplary process for identifying expert domains for the query categories included in the ontology of FIGS. 2A and 2B.

Referring to FIG. 14, a process 1400 is used to associate expert domains with query categories included in a query ontology. The process 1400 identifies domains from which a high percentage of search results for queries from a particular category in the query ontology are identified and associates the identified domains with the particular category as expert domains for the particular category. Queries that correspond to the particular category are submitted to the expert domains such that search results retrieved for the particular category are representative of the particular category. In other words, the expert domains are the information sources to which a query that corresponds to the particular category are routed during the process 420 of FIG. 12. The process 1400 is executed by the ontology engine 120 to prepare the ontology 125, both of FIG. 1.

The process 1400 begins when an ontology that relates queries to query categories is maintained and/or accessed (1405). For example, an ontology that is similar to the ontology 125 of FIGS. 1, 2A, and 2B is maintained.

The ontology engine submits queries associated with categories included in the ontology to one or more search engines (1410). In one implementation, all queries included in the ontology are submitted to the one or more search engines. In another implementation, a particular number of queries from each of the categories included in the ontology are submitted to the one or more search engines. In general, any number of queries included in the ontology may be submitted, particularly if the submitted queries evenly represent the categories included in the ontology.

Furthermore, in some implementations, the queries may be submitted to all available search engines or to a subset of the available search engines. For example, the queries may be submitted to a general search engine from which many types of search results may be retrieved. Alternatively, the queries may be submitted to multiple search engines from which specialized types of search results may be retrieved. As another example, the queries may be submitted both to general and specialized search engines. In general, the queries may be submitted to any set of search engines, particularly if different types of search results may be retrieved evenly from the search engines. Search results are received from the search engines to which the queries were submitted (1415).

The ontology engine determines a frequency of occurrence in the received search results for each domain from which one of the received search results was retrieved (1420). Determining the frequency of occurrence for a domain may include determining a probability that one of the received search results was retrieved from the domain. Such a probability may be defined as the ratio of the number of the received search results that were retrieved from the domain to the number of the received search results. Alternatively, determining the frequency of occurrence for a domain may include determining a number of the received search results that were retrieved from the domain. In one implementation, the frequencies of occurrence for the domains from which the search results were retrieved may be determined using only a subset of the retrieved search results. For example, a particular number of the search results that most closely match each of the submitted queries may be used to determine the frequencies.

The determined frequencies of occurrence represent a base statistical model of domain frequency from a random or general collection of search results. The determined frequencies will be compared to frequencies determined for search results for queries from a particular category in the query ontology. Domains with higher frequencies in search results for queries from the particular category will be identified as expert domains for the particular category.

The ontology engine then selects a category from within the ontology (1425). The ontology engine submits queries associated with the selected category to one or more search engines (1430). Some or all of the queries associated with the selected category may be submitted to the one or more search engines. The queries may be submitted to the same search engines to which the queries from the categories were previously submitted. Search results for the submitted queries from the selected category are received from the one or more search engines (1435).

The ontology engine determines a frequency of occurrence in the search results received for the queries from the selected category for each domain from which one of the received search results was retrieved (1440). The frequencies may be determined in a manner similar to how the frequencies were previously determined using search results received for the queries included in the ontology.

For each domain from which one of the received search results was retrieved, the ontology engine compares the frequency of occurrence in the search results for the queries from the selected category to the frequency of occurrence in the search results for the queries from the categories (1445). In general, comparing the two frequencies for a particular domain indicates whether the particular domain occurs more frequently in the search results for the queries from the selected category. Comparing the two frequencies also may indicate whether the particular domain occurs with relatively equal frequency in both the search results for the queries from the selected category and the search result for the queries from the categories. Comparing the two frequencies may include identifying a weighting factor for the domain. The weighting factor indicates the relative difference between the two frequencies. A high weighting factor may indicate that the domain occurs more frequently in the search results for the queries from the selected category than in the search results for the queries from the categories. On the other hand, a low weighting factor may indicate that the domain does not occur more frequently in the search results for the queries from the selected category than in the search results for the queries from the categories.

Domains that appear more frequently in the search results for the queries from selected category of the query ontology are identified as expert domains for the selected category (1450). The identification of the expert domains may be based on the weighting factors of the domains that appear in the received search results. In one implementation, a particular number of domains with the highest weighting factors are identified as the expert domains. In another implementation, domains with weighting factors that exceed a threshold weighting factor are identified as the expert domains.

A user may be enabled to add or remove expert domains for the selected category (1455). For example, the user may access the ontology engine with a client system, such as the client system 105 of FIG. 1, to add or remove expert domains for the selected category. Alternatively, the user may access the ontology engine directly to specify the expert domains. The user that adds or removes expert domains for the selected category may be an editor or an administrator of the ontology and the ontology engine. Enabling the user to review the automatically identified expert domains enables the user to determine that the best expert domains have been identified for the selected category. The user may remove expert domains that are not the best expert domains for the selected category. The user also may add expert domains that have not been automatically identified as the best expert domains for the selected category. In some implementations, the user may be prevented from removing one or more of the expert domains. For example, the user may be prevented from removing the expert domain for which the best weighting factor has been identified. As a result, the expert domains with the best weighting factors always may be associated with and used for the selected category.

The ontology engine associates one or more of the identified expert domains with the selected category (1460). In one implementation, the expert domains are stored with the selected category in the query ontology, as is illustrated in FIGS. 2A and 2B. In another implementation, the expert domains are associated with the selected category in a mapping of categories to expert domains for the categories that is external to the query ontology. Such a mapping may be maintained by the ontology engine.

The ontology engine determines whether expert domains have been identified for all categories included in the query ontology or whether expert domains need to be identified for more categories (1465). If so, then the ontology engine selects one of the categories for which expert domains have not already been identified (1425), submits queries associated with the selected category to one or more search engines (1430), and receives search results for the submitted query are received (1435). Frequencies of domain occurrence are determined (1440), and the frequencies are compared to previously determined frequencies of occurrence of domain that appear in search results for the queries from the categories (1445). Based on the comparison, expert domains for the selected category are identified (1450), modified by a user (1455), and associated with the selected category (1460). In this manner, expert domains are identified sequentially for each category included in the query ontology, until expert domains have been identified for all categories included in the query ontology, at which point the process 1400 is done (1470).

Figure 15:
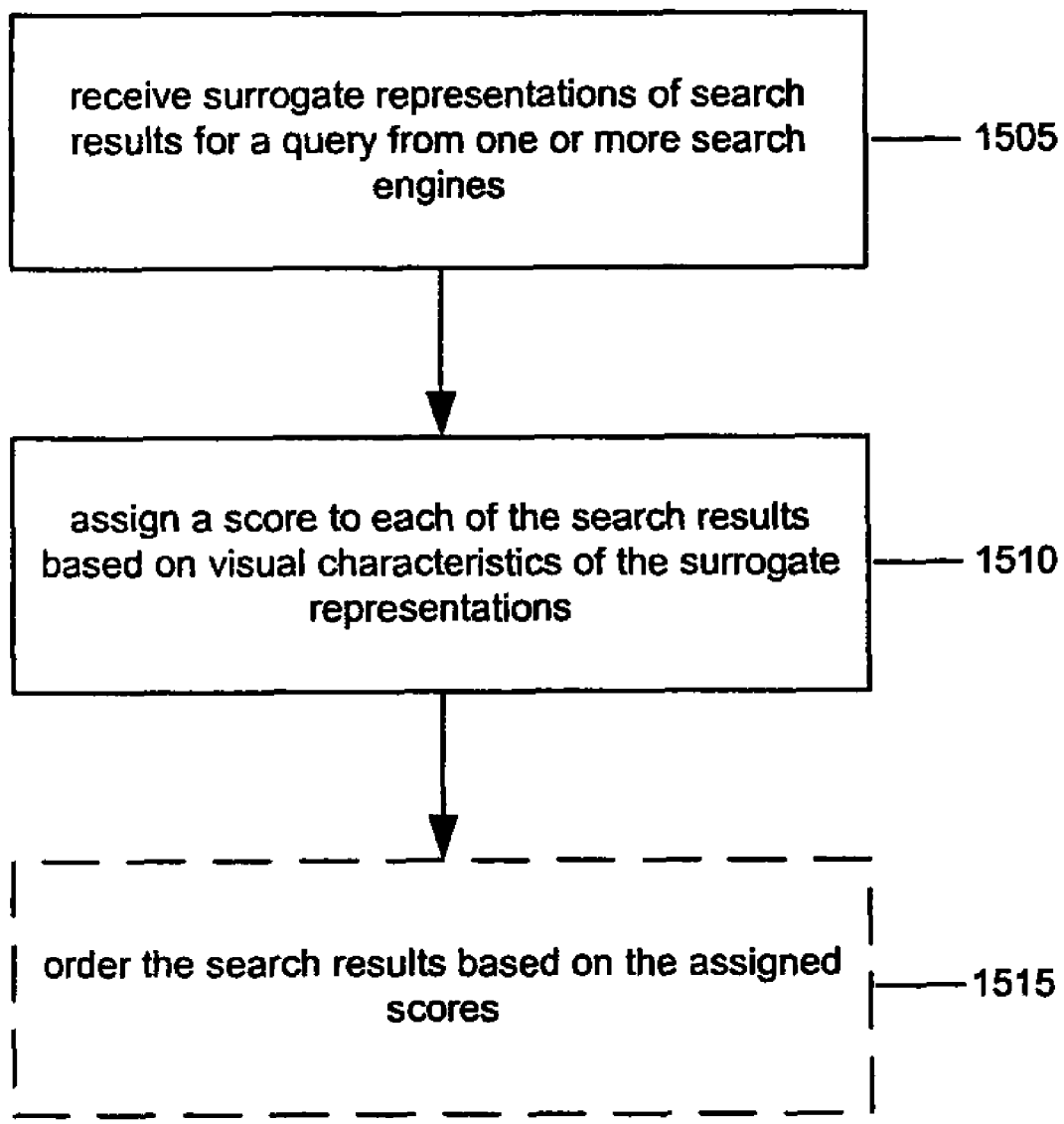
FIG. 15 is a flow chart illustrating an exemplary process for assigning scores to search results based on visual characteristics of surrogate representations of the search results.

Referring to FIG. 15, a process 425 represents one implementation of the operation 425 of FIG. 4, in which scores are assigned to search results based on visual characteristics of surrogate representations of the search results. Assigning scores based on the surrogate representations mimics user assessment of the relevance of the search results. The process 425 may be executed by a search interface, such as the search interface 110 of FIG. 1, as part of the process 400 of FIG. 4.

The search interface receives surrogate representations of search results for a query from one or more search engines (1505). More particularly, the search interface receives a set of search results for the query from each of the one or more search engines. The search results in a set of search results may be ordered based on scores assigned by the search engine from which the set of search results was received. The query may have been submitted to the one or more search engines during the process 400 of FIG. 4, or during the process 420 of FIG. 12.

The surrogate representations of the search results are relatively short summaries or excerpts of the search results that may be presented in place of the search results themselves, thus enabling an overview of various search results to be perceived by a user concurrently. The surrogate representation of a search result may include a title of the search result, a short description or summary of the search result, an address from which the search result may be accessed, a hyperlink to the search result, a date on which the search result was created or modified, keywords that appear in the search result, and other metadata that describes the search result. The surrogate representations are presented to a user in place of the search results, and the user may select at least a portion of a surrogate representation of a search result to access the search result corresponding to the surrogate representation. In some implementations, portions of the surrogate representations, such as the dates and the keywords, may not be presented, but still may be considered when assigning scores.

The search interface assigns a score to each of the search results based on visual characteristics of the surrogate representations (1510). The score assigned to a search result may depend on the presence of the query in the surrogate representation of the search result. For example, the search result may be assigned a higher score when the query appears in the surrogate representation of the search result than when the query does not appear in the surrogate representation. The score assigned to a search result also may depend on a location of the query within the surrogate representation of the search result. For example, a higher score may be assigned to the search result when the query is included in the title of the surrogate representation than when the query is included in the description of the surrogate representation. Alternatively or additionally, the score assigned to a search result may depend on an amount of the query found in the surrogate representation of the search result. For example, a higher score may be assigned to the search result when the entire query is found in the surrogate representation than when only a portion of the query is found in the surrogate representation of the search result. The amount of the query found in the surrogate representation may be measured as a number of terms within the query that are found in the surrogate representation, or as a percentage of the terms within the query that are found in the surrogate representation.

The score assigned to a search result may depend on an amount of the surrogate representation of the search result, or of a component of the surrogate representation, reflecting terms from within the query. For example, a higher score may be assigned to the search result when the query occupies a larger portion of surrogate representation than when the query occupies a smaller portion of the surrogate representation of the search result. The amount of the surrogate representation, or of the component of the surrogate representation, that reflects query terms may be measured as a percentage of the words in the surrogate representation or the component thereof that are query terms. The score assigned to a search result also may depend on a distance between terms of the query in the surrogate representation of the search result. For example, a higher score may be assigned to the search result when the terms of the query appear uninterrupted in the surrogate representation than when one or more words are found between two of the terms of the query in the surrogate representation of the search result. The score assigned to a search result also may depend on an order of the terms of the query in the surrogate representation of the search result. For example, a higher score may be assigned to the search result when the order of the terms of the query is unchanged in the surrogate representation than when the order of the terms of the query is changed in the surrogate representation of the search result.

The score assigned to a search result also may depend on the date included the surrogate representation of the search result. For example, the score of the search result may correspond directly to the age of the search result, which may be indicated by the corresponding date. In some implementations, the score may be assigned to the search result based on a combination of the above-identified factors. In some implementations, the score identified for a search result based on the surrogate representation of the search result may be combined with a score assigned to the search result by the one or more search engines.

In one implementation, the score assigned to a search result may depend on more than one of the above factors. In such an implementation, a score may be assigned based on each of the factors, and weights may be used to combine the factor-specific scores into a single score for the search result. For example, a score of one may be assigned to the search result based on a first of the above described factors, and a score of two may be assigned based on a second of the above described factors. The first factor may have a weight of one, and the second factor may have a weight of two, so the score assigned to the search result may be the sum of the products of each of the factor-specific scores and the corresponding weight, which is five in the above example.

Weights also may be used when determining one of the factor specific scores. For example, a particular score may be assigned to a search result when the corresponding query appears in the surrogate representation of the search result. In addition, weights may be assigned to parts of the surrogate representation such that a higher score is assigned to the search result when the query is found in particular parts of the surrogate representation. For example, a weight of three may be assigned to the title of the surrogate representation, and a weight of one may be assigned to the description of the surrogate representation to indicate that the search result should be assigned a higher score when the query appears in the title than when the query appears in the description. The score assigned to the search result based on the presence of the query in the surrogate representation may be the product of the particular score assigned to the search result as a result of the query appearing in the surrogate representation and the weight of the part of the surrogate representation in which the query appears.

The search interface may order the search results based on the assigned scores (1515). Sorting the search results may include merging the received sets of search results into a single ordered list of search results. In one implementation, the search results may be ordered such that search results appear in order of decreasing score. The sorted search results may be presented to a user that submitted a query for which the search results have been identified. Alternatively, the search results may be processed further prior to presentation.

In some implementations, scores are assigned to the search results in one of the sets of search results such that the ordering of the search results within the set, which is based on scores assigned to the search results by the search engine from which the set of search results was received, is unchanged. For example, when a first search result was ordered above a second search result by a search engine that returned the first and second search results, scores are assigned to the first and second search results such that the first search result remains ordered above the second search result, even though visual characteristics of surrogate representations of the first and second search results may indicate that the second search result should be ordered above the first search result. In other words, the scores assigned to the search results that are based on the surrogate representations of the search results may be combined with the scores assigned to the search results by the search engine, with the scores assigned by the search engine being given a higher importance or weight in the overall score assigned to the search results. Assigning scores in such a manner is advantageous because the search engine may consider a wide array of information when scoring and ordering the search results, which results in the search engine being better suited to order the search results.

However, in implementations where the search results are received from multiple search engines, assigning scores to the search results after the search results are received ensures that the search results are scored consistently, regardless of the search engine from which the search result was retrieved. Therefore, the search results are merged based on consistent scoring, which may reduce bias towards or away from results from a particular search engine.

Scoring the search results based on the visual characteristics of the surrogate representations of the search results mimics user assessment of the relevance of the search results. Therefore, search results that a user would assess as very relevant would be assigned a high score, and search results that a user would assess as not very relevant would be assigned a low score. As a result, the search results that the user would assess as very relevant are presented first when the search results are ordered based on the assigned scores.

Figure 16:
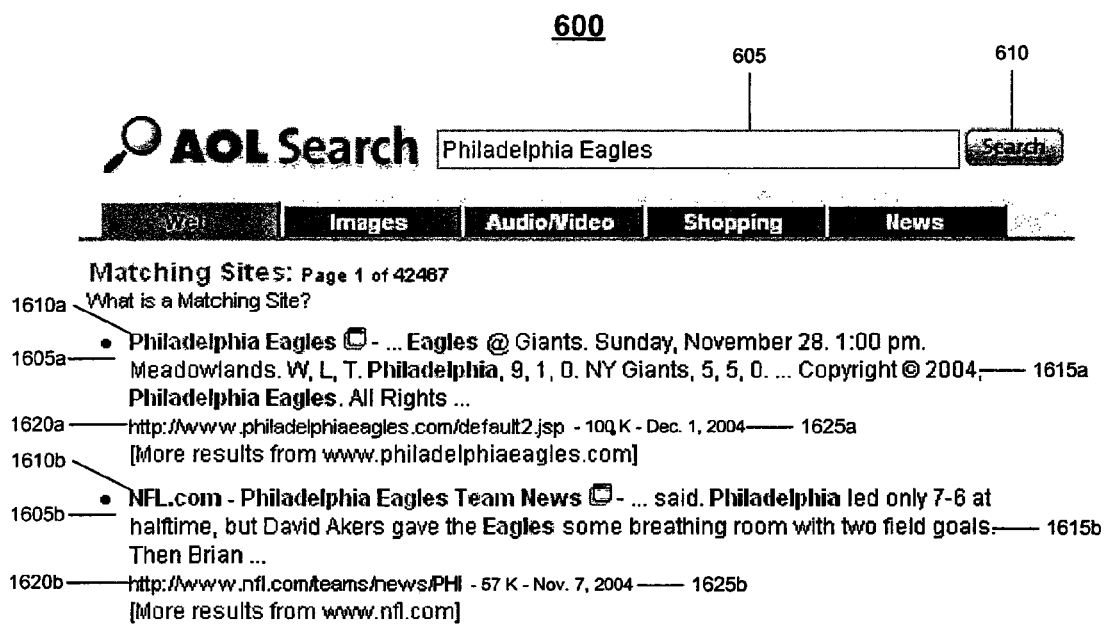
FIG. 16 illustrates exemplary surrogate representations of search results.

Referring to FIG. 16, the search tool user interface 600 displays search results 1605a and 1605b that are retrieved for a query that has been entered in the text field 605 after the button 610 has been selected. More particularly, the search tool user interface 600 displays surrogate representations of the search results 1605a and 1605b. The surrogate representations 1605a and 1605b include titles 1610a and 1610b, descriptions 1615a and 1615b, addresses 1620a and 1620b, and dates 1625a and 1625b, respectively.

The titles 1610a and 1610b are titles of the search results 1605a and 1605b. The titles 1610a and 1610b may be hyperlinks that may be selected to access the search results 1605a and 1605b. The descriptions 1615a and 1615b are excerpts from, or short summaries of, the search results 1605a and 1605b. The descriptions 1615a and 1615b may be specified to include one or more terms from the query. The addresses 1620a and 1620b identify locations from which the search results 1605a and 1650b may be accessed. The addresses 1620a and 1620b also may be hyperlinks that may be selected to access the search results 1605a and 1605b. The dates 1625a and 1625b may identify dates on which the search results 1605a and 1605b were first accessible, or were last modified.

The search result 1605a has been ordered before the search result 1605b based on scores that have been assigned to the search results 1605a and 1605b. The scores assigned to the search results 1605a and 1650b are based on visual characteristics of the surrogate representations of the search results 1605a and 1605b, as is described above with respect to the operation 1510 of the process 425 of FIG. 15. The search result 1605a may be ordered before the search result 1605b because the query entered in the text field 605 occupies a larger portion of the title 1610a than of the title 1610b. In addition, a higher score may be give to the search result 1605a because the entire query appears continuously in the description 1615a, while the entire query does not appear continuously in the description 1615b. Furthermore, the query is found in the address 1620a and is not found in the address 1620b, which may indicate that the search result 1605a should be given a higher score than the search result 1605b. The dates 1625a and 1625b, which indicate that the search result 1605a is newer than the search result 1605b, may indicate that the search result 1605a should be given a higher score than the search result 1605b.

Figure 17:
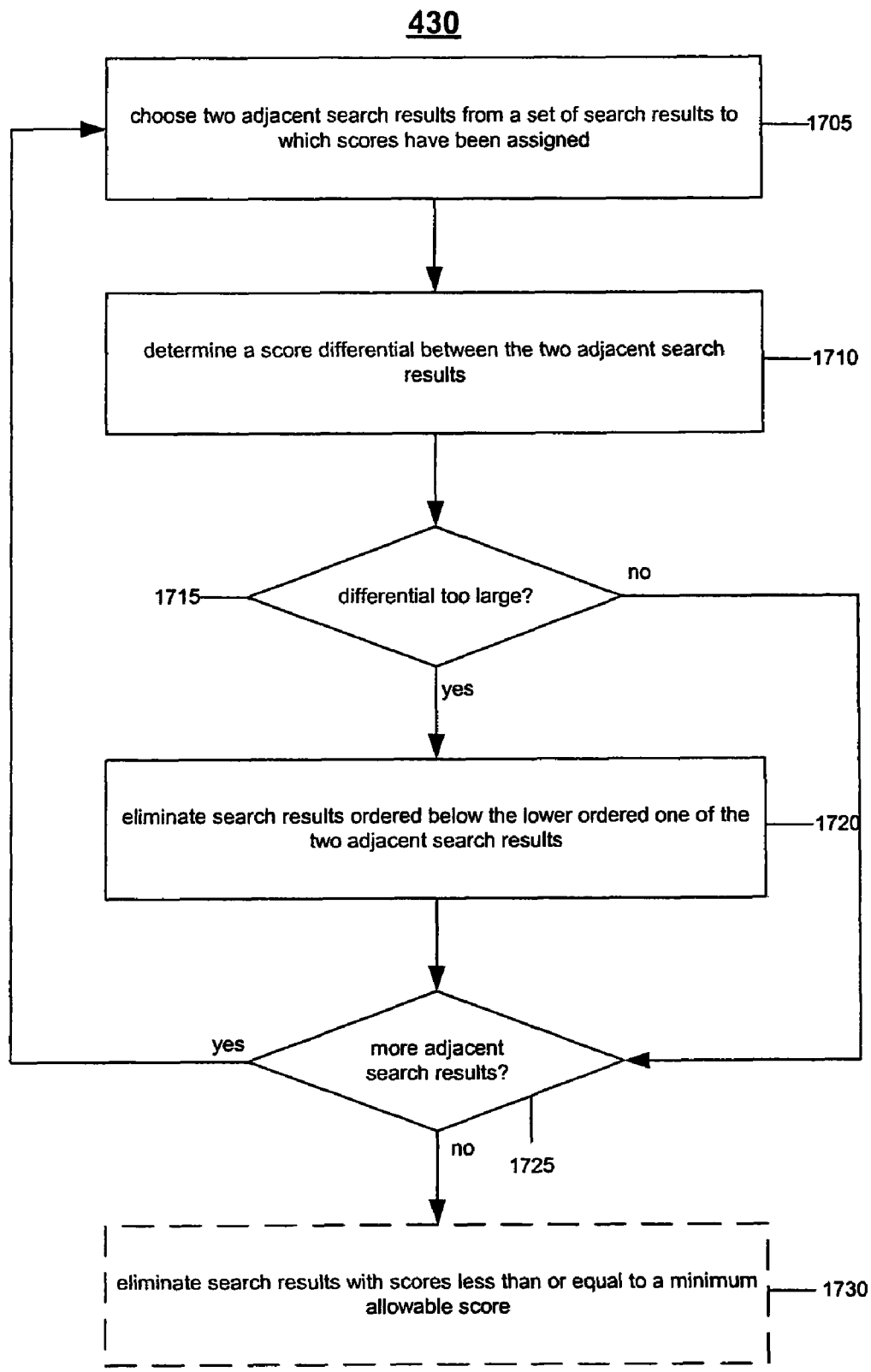
FIG. 17 is a flow chart illustrating an exemplary process for filtering search results based on scores assigned to the search results.

Referring to FIG. 17, a process 430 represents one implementation of the operation 430 of FIG. 4, in which search results are filtered based on scores assigned to the search results. The process 430 may be executed by a search interface, such as the search interface 110 of FIG. 1, as part of the process 400 of FIG. 4.

The search interface chooses two adjacent search results from a set of search results to which scores have been assigned (1705). The scores may be assigned to the search results according to the process 425 of FIG. 15. Alternatively, the scores may have been assigned by a source from which the search result was retrieved. Two search results are called adjacent when no other search results have scores that are between the scores of the two search results. In implementations where high scores represent high quality search results, the two adjacent search results that are chosen may be the search results with the two highest assigned scores. In implementations where low scores represent high quality search results, the two adjacent search results that are chosen may be the search results with the two lowest assigned scores. The search results may be ordered to facilitate selection of the two adjacent search results.

The search interface determines a score differential between the two adjacent search results (1710). The score differential is the difference between the scores assigned to the two adjacent search results. The differential may be determined as an absolute score differential or as a relative score differential. For example, the score differential may be determined as a percentage of a maximum, minimum, or average score of the search results, as a percentage of the larger or the smaller of the scores of the two adjacent search results, as a percentage of a difference between the maximum and the minimum scores, or as a percentage of a difference between the scores of the two adjacent search results. The search interface determines whether the score differential is too large (1715). In one implementation, the score differential may be too large when the score differential exceeds a threshold differential. The threshold differential may be an absolute score differential or a relative score differential, such as a percentage of a maximum, minimum, or average score of the search results, as a percentage of a difference between the maximum and the minimum scores, a percentage of a difference between the scores identified for the two adjacent search results, or as a percentage of a standard deviation of the scores of the search results.

If the score differential is too large, then the search interface eliminates search results ordered below the lower ordered one of the two adjacent search results (1720). For example, in implementations where a large score is indicative of a high quality search result, search results with scores that are less than or equal to the smaller of the scores of the two adjacent search results may be eliminated. As another example, in implementations where a small score is indicative of a high quality search result, search results with scores that are greater than or equal to the larger of the scores of the two adjacent search results may be eliminated. A large score differential between a first search result and a second search result indicates a large difference in the qualities of the first and second search results. More particularly, the lower ordered adjacent search result is of a significantly lower quality than the higher ordered adjacent search result. The lower quality search result may not be useful to a user for which the search results were retrieved, as a result of being of the lower quality. Therefore, that search result, and other search results with even lower qualities, may be eliminated to prevent providing low quality search results to the user.

If the score differential is not too large, then the search interface determines whether more pairs of adjacent search results may be found within the search results (1725). If so, then the search interface chooses another pair of adjacent search results (1705), and the search results may be filtered based on the score differential between the chosen pair of adjacent search results (1710, 1715, 1720). In this manner, pairs of adjacent search results are sequentially processed to determine if search results should be eliminated based on score differentials of the pairs of adjacent search results.

The search interface also may eliminate search results with scores less than or equal to a minimum allowable score (1730). Search results with a score less than or equal to the minimum allowable score may be of a low quality. The low quality search results may not be useful to a user for which the search results were retrieved, as a result of being of the lower quality. Therefore, those search results may be eliminated to prevent providing low quality search results to the user.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for performing a search, the method comprising:
   receiving a search query including multiple terms;
   identifying a combination of terms within the search query, the combination of terms within the search query including at least two terms of the search query;
   accessing information related to categories of search queries, wherein the accessed information comprises a plurality of terms related to the categories of search queries;
   comparing the combination of terms within the search query with the accessed information related to categories of search queries;
   based on comparison results, identifying a subset of the categories as being related to the search query;
   selecting from the identified subset of the categories a category that has been previously selected most often among the identified subset of the categories;
   prompting a user to select at least one term from the plurality of terms related to the selected category;
   creating an updated search query comprising at least one term present in the received search query and the at least one selected term;
   performing a search for the updated search query based on the identified subset of categories;
   wherein identifying the combination of terms within the search query includes:
   identifying a first combination of terms within the search query, the first combination of terms within the search query including at least two terms of the search query; and
   identifying a second combination of terms within the search query, the second combination of terms within the search query including at least two terms of the search query and the second combination of terms being in an order different than the order of terms in the first combination of terms;
   comparing the combination of terms within the search query with the accessed information related to categories of search queries includes:
   comparing the first combination of terms within the search query with the accessed information related to categories of search queries; and
   comparing the second combination of terms within the search query with the accessed information related to categories of search queries; and
   identifying the subset of the categories as being related to the search query includes identifying a subset of the categories as being related to the search query based on the comparison of the first combination of terms within the search query with the accessed information related to categories of search queries and the comparison of the second combination of terms within the search query with the accessed information related to categories of search queries.

2. The method of claim 1 further comprising:
   maintaining a query ontology that includes multiple query categories and one or more queries associated with each of the multiple query categories,
   wherein:
   accessing information related to categories of search queries includes accessing the one or more queries associated with each of the multiple query categories in the query ontology;
   comparing the combination of terms within the search query with the accessed information related to categories of search queries includes comparing the combination of terms with the one or more queries associated with each of the multiple query categories in the query ontology; and
   identifying the subset of the categories as being related to the search query includes identifying a subset of the multiple query categories in the query ontology based on comparison results, the subset of the multiple query categories including one or more query categories in the query ontology that are associated with one or more queries that match the combination of terms.

3. The method of claim 1 wherein performing the search for the search query based on the identified subset of categories includes:
   identifying an information source corresponding to at least one category included in the identified subset of categories; and performing a search on the identified information source such that search results from the information source are prioritized over search results from other information sources.

4. The method of claim 3 wherein performing the search on the identified information source such that search results from the information source are prioritized over search results from other information sources includes presenting search results from only the identified information source.

5. The method of claim 1 further comprising displaying search results identified by performing the search.

6. The method of claim 1 wherein the combination of terms within the search query represent a combination of at least two consecutive terms from within the search query, the at least two consecutive terms being included in the combination of terms in an order in which the at least two consecutive terms are included within the search query.

7. The method of claim 1 wherein identifying the combination of terms within the search query includes identifying a combination of terms within the search query that includes two nonconsecutive terms from within the search query.

8. The method of claim 7 wherein identifying a combination of terms within the search query that includes two nonconsecutive terms from within the search query includes identifying a combination of terms within the search query that includes a first term of the search query and a third term of the search query and does not include the second term of the search query.

9. A computer-readable storage medium storing instructions that, when executed by a processor, perform operations comprising:
receiving a search query including multiple terms;
identifying a combination of terms within the search query, the combination of terms within the search query including at least two terms of the search query;
accessing information related to categories of search queries, wherein the accessed information comprises a plurality of terms related to the categories of search queries;
comparing the combination of terms within the search query with the accessed information related to categories of search queries;
based on comparison results, identifying a subset of the categories as being related to the search query;
selecting from the identified subset of the categories a category that has been previously selected most often among the identified subset of the categories;
prompting a user to select at least one term from the plurality of terms related to the selected category;
creating an updated search query comprising at least one term present in the received search query and the at least one selected term; performing a search for the updated search query based on the identified subset of categories;
wherein identifying the combination of terms within the search query includes:
identifying a first combination of terms within the search query, the first combination of terms within the search query including at least two terms of the search query; and
identifying a second combination of terms within the search query, the second combination of terms within the search query including at least two terms of the search query and the second combination of terms being in an order different than the order of terms in the first combination of terms;
comparing the combination of terms within the search query with the accessed information related to categories of search queries includes:
comparing the first combination of terms within the search query with the accessed information related to categories of search queries; and
comparing the second combination of terms within the search query with the accessed information related to categories of search queries; and
identifying the subset of the categories as being related to the search query includes identifying a subset of the categories as being related to the search query based on the comparison of the first combination of terms within the search query with the accessed information related to categories of search queries and the comparison of the second combination of terms within the search query with the accessed information related to categories of search queries.

10. The computer-readable storage medium of claim 9 further comprising:
maintaining a query ontology that includes multiple query categories and one or more queries associated with each of the multiple query categories,
wherein:
accessing information related to categories of search queries includes accessing the one or more queries associated with each of the multiple query categories in the query ontology;
comparing the combination of terms within the search query with the accessed information related to categories of search queries includes comparing the combination of terms with the one or more queries associated with each of the multiple query categories in the query ontology; and
identifying the subset of the categories as being related to the search query includes identifying a subset of the multiple query categories in the query ontology based on comparison results, the subset of the multiple query categories including one or more query categories in the query ontology that are associated with one or more queries that match the combination of terms.

11. The computer-readable storage medium of claim 9 wherein identifying the combination of terms within the search query includes identifying a combination of terms within the search query that includes two nonconsecutive terms from within the search query.

12. A computer system comprising:
at least one processor;
a memory in communication with the processor;
means for receiving a search query including multiple terms;
means for identifying a combination of terms within the search query, the combination of terms within the search query including at least two terms of the search query;
means for accessing information contained in the memory related to categories of search queries, wherein the accessed information comprises a plurality of terms related to the categories of search queries;
means for comparing the combination of terms within the search query with the accessed information related to categories of search queries;
means for, based on comparison results, identifying a subset of the categories as being related to the search query;
means for selecting from the identified subset of the categories a category that has been previously selected most often among the identified subset of the categories;
means for prompting a user to select at least one term from the plurality of terms related to the selected category;

means for creating an updated search query comprising at least one term present in the received search query and the at least one selected term;

means for performing a search for the updated search query based on the identified subset of categories;

wherein identifying the combination of terms within the search query includes:

identifying a first combination of terms within the search query, the first combination of terms within the search query including at least two terms of the search query; and identifying a second combination of terms within the search query, the second combination of terms within the search query including at least two terms of the search query and the second combination of terms being in an order different than the order of terms in the first combination of terms;

comparing the combination of terms within the search query with the accessed information related to categories of search queries includes:

comparing the first combination of terms within the search query with the accessed information related to categories of search queries; and comparing the second combination of terms within the search query with the accessed information related to categories of search queries; and identifying the subset of the categories as being related to the search query includes identifying a subset of the categories as being related to the search query based on the comparison of the first combination of terms within the search query with the accessed information related to categories of search queries and the comparison of the second combination of terms within the search query with the accessed information related to categories of search queries.

* * * * *